US011506235B2

(12) United States Patent
Fransson et al.

(10) Patent No.: US 11,506,235 B2
(45) Date of Patent: Nov. 22, 2022

(54) ELEMENTS AND A LOCKING DEVICE FOR AN ASSEMBLED PRODUCT

(71) Applicant: Välinge Innovation AB, Viken (SE)

(72) Inventors: Jonas Fransson, Allerum (SE); Niclas Håkansson, Viken (SE); Agne Pålsson, Hasslarp (SE)

(73) Assignee: VALINGE INNOVATION AB, Viken (SE)

( * ) Notice: Subject to any disclaimer, the term of this patent is extended or adjusted under 35 U.S.C. 154(b) by 931 days.

(21) Appl. No.: 15/978,630

(22) Filed: May 14, 2018

(65) Prior Publication Data

US 2018/0328396 A1  Nov. 15, 2018

(30) Foreign Application Priority Data

May 15, 2017  (SE) .................................... 1750593-4

(51) Int. Cl.
*F16B 12/38* (2006.01)
*F16B 12/22* (2006.01)
(Continued)

(52) U.S. Cl.
CPC .............. *F16B 12/38* (2013.01); *F16B 12/22* (2013.01); *F16B 12/24* (2013.01); *F16B 12/26* (2013.01);
(Continued)

(58) Field of Classification Search
CPC ........ F16B 12/26; F16B 12/38; F16B 21/183; F16B 21/186; F16B 12/22; F16B 12/24;
(Continued)

(56) References Cited

U.S. PATENT DOCUMENTS

| 291,032 A | 1/1884 | Cleland |
|---|---|---|
| 634,581 A | 10/1899 | Miller |
(Continued)

FOREIGN PATENT DOCUMENTS

| AT | 400 611 B | 2/1996 |
|---|---|---|
| CH | 365 507 A | 11/1962 |
(Continued)

OTHER PUBLICATIONS

U.S. Appl. No. 14/486,681, Hans Brännström, Agne Pålsson and Peter Derelöv, filed Sep. 15, 2014, (Cited herein as US Patent Application Publication No. 2015/0078807 A1 of Mar. 19, 2015).
(Continued)

*Primary Examiner* — Matthew R McMahon
(74) *Attorney, Agent, or Firm* — Buchanan Ingersoll & Rooney P.C.

(57) ABSTRACT

A set including a first element with a cylindrical shaped part, a second element having a cylindrical shaped groove with a circular opening in an outer surface of the second element, and a mechanical locking device. The mechanical locking device includes a tongue groove, a displacement groove and a flexible tongue in the displacement groove, and is configured to lock the cylindrical shaped part to the cylindrical shaped groove. The flexible tongue is configured to cooperate with the tongue groove for locking the cylindrical shaped part to the cylindrical shaped groove. The flexible tongue is configured to be reshaped and displaced in the displacement groove during locking, and spring back to a locked position. The flexible tongue is configured to exert a spring force on the tongue groove in the locked position.

19 Claims, 16 Drawing Sheets

(51) Int. Cl.
*F16B 12/26* (2006.01)
*F16B 12/34* (2006.01)
*F16B 12/32* (2006.01)
*F16B 12/24* (2006.01)
*F16B 21/18* (2006.01)
*A47C 4/02* (2006.01)
*A47B 13/00* (2006.01)

(52) U.S. Cl.
CPC .............. *F16B 12/32* (2013.01); *F16B 12/34* (2013.01); *F16B 21/183* (2013.01); *F16B 21/186* (2013.01); *A47B 13/003* (2013.01); *A47B 2230/0037* (2013.01); *A47C 4/021* (2013.01)

(58) Field of Classification Search
CPC ........ F16B 12/32; F16B 12/34; A47B 13/003; A47B 2230/0037; A47C 4/021
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,314,500 A * | 2/1982 | Hoppe .................... F42B 15/36 102/378 |
| 4,324,517 A | 4/1982 | Dey |
| 4,403,886 A | 9/1983 | Haeusler |
| 4,405,253 A | 9/1983 | Stockum |
| 4,471,978 A * | 9/1984 | Kramer .................... B60T 17/04 285/136.1 |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Statsny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |

(56) References Cited

U.S. PATENT DOCUMENTS

| | | |
|---|---|---|
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 9,989,075 B2 * | 6/2018 | Bueter ................ F15B 15/1438 |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |

(56) References Cited

U.S. PATENT DOCUMENTS

| | | |
|---|---|---|
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |

FOREIGN PATENT DOCUMENTS

| | | | | |
|---|---|---|---|---|
| CH | 685 276 | A5 | 5/1995 | |
| CH | 696 889 | A5 | 1/2008 | |
| CH | 698 988 | B1 | 12/2009 | |
| CH | 705 082 | A2 | 12/2012 | |
| CN | 101099618 | A | 1/2008 | |
| CN | 102 917 616 | A | 2/2013 | |
| CN | 203424576 | U | 2/2014 | |
| DE | 1062499 | B * | 7/1959 | F16B 21/186 |
| DE | 1107910 | B | 5/1961 | |
| DE | 24 14 104 | A1 | 10/1975 | |
| DE | 25 14 357 | A1 | 10/1975 | |
| DE | 26 35 237 | A | 2/1978 | |
| DE | 31 03 281 | A1 | 8/1982 | |
| DE | 228 872 | A1 | 10/1985 | |
| DE | 4102451 | A1 * | 8/1991 | H02K 5/1675 |
| DE | 42 29 115 | A1 | 3/1993 | |
| DE | 94 17 168 | U1 | 2/1995 | |
| DE | 198 31 936 | A1 | 2/1999 | |
| DE | 298 20 031 | U1 | 2/1999 | |
| DE | 198 05 538 | A1 | 8/1999 | |
| DE | 203 04 761 | U1 | 4/2004 | |
| DE | 299 24 630 | U1 | 5/2004 | |
| DE | 20 2005 019 986 | U1 | 2/2006 | |
| DE | 20 2004 017 486 | U1 | 4/2006 | |
| DE | 20 2008 011 589 | U1 | 11/2008 | |
| DE | 20 2009 008 825 | U1 | 10/2009 | |
| DE | 10 2008 035 293 | A1 | 2/2010 | |
| DE | 10 2009 041 142 | A1 | 3/2011 | |
| DE | 10 2011 057 018 | A1 | 6/2013 | |
| DE | 102012009035 | A1 * | 9/2013 | F16B 12/24 |
| DE | 10 2013 008 595 | A1 | 11/2013 | |
| DE | 10 2015 103 429 | A1 | 10/2015 | |
| DE | 10 2014 110 124 | A1 | 1/2016 | |
| DE | 20 2017 101 856 | U1 | 4/2017 | |
| EP | 0 060 203 | A2 | 9/1982 | |
| EP | 0 060 203 | A3 | 9/1982 | |
| EP | 0 357 129 | A1 | 3/1990 | |
| EP | 0 362 968 | A | 4/1990 | |
| EP | 0 675 332 | A2 | 10/1995 | |
| EP | 0 871 156 | A2 | 10/1998 | |
| EP | 0 935 076 | A1 | 8/1999 | |
| EP | 1 048 423 | A2 | 11/2000 | |
| EP | 1 048 423 | B9 | 5/2005 | |
| EP | 1 650 375 | A1 | 4/2006 | |
| EP | 1 671 562 | A1 | 6/2006 | |
| EP | 1 650 375 | A8 | 9/2006 | |
| EP | 1 863 984 | A1 | 12/2007 | |
| EP | 1 922 954 | A1 | 5/2008 | |
| EP | 2 017 403 | A2 | 1/2009 | |
| EP | 2 037 128 | A1 | 3/2009 | |
| EP | 1 922 954 | B1 | 7/2009 | |
| EP | 2 333 353 | A2 | 6/2011 | |
| EP | 1 863 984 | B1 | 11/2011 | |
| EP | 2 487 373 | A1 | 8/2012 | |
| EP | 3 031 998 | A1 | 6/2016 | |
| FR | 1155424 | A * | 4/1958 | F16B 21/186 |
| FR | 2 062 731 | A5 | 6/1971 | |
| FR | 2 517 187 | A1 | 6/1983 | |
| FR | 2 597 173 | A1 | 10/1987 | |
| FR | 2 602 013 | A1 | 1/1988 | |
| GB | 245332 | | 1/1926 | |
| GB | 799155 | A * | 8/1958 | F16B 21/186 |
| GB | 799155 | A | 8/1958 | |
| GB | 1 022 377 | A | 3/1966 | |
| GB | 2 163 825 | A | 3/1986 | |
| GB | 2 315 988 | A | 2/1998 | |
| GB | 2 445 954 | A | 7/2008 | |
| GB | 2 482 213 | A | 1/2012 | |
| GB | 2 520 927 | A | 6/2015 | |
| JP | S53-113160 | U | 9/1978 | |
| JP | H06-22606 | U | 3/1994 | |
| JP | 2003-239921 | A | 8/2003 | |
| KR | 10-1147274 | B1 | 5/2012 | |
| KR | 2014-0042314 | A | 4/2014 | |
| WO | WO 87/07339 | A1 | 12/1987 | |
| WO | WO 90/07066 | | 6/1990 | |
| WO | WO 99/22150 | A1 | 5/1999 | |
| WO | WO 99/41508 | A2 | 8/1999 | |
| WO | WO 00/66856 | A1 | 11/2000 | |
| WO | WO 01/02669 | A1 | 1/2001 | |
| WO | WO 01/02670 | A1 | 1/2001 | |
| WO | WO 01/51733 | A1 | 7/2001 | |
| WO | WO 01/53628 | A1 | 7/2001 | |
| WO | WO 02/055809 | A1 | 7/2002 | |
| WO | WO 02/055810 | A1 | 7/2002 | |
| WO | WO-03002871 | A1 * | 1/2003 | F02N 15/025 |
| WO | WO 03/016654 | A1 | 2/2003 | |
| WO | WO 03/027510 | A2 | 4/2003 | |
| WO | WO 03/083234 | A1 | 10/2003 | |
| WO | WO 2004/079130 | A1 | 9/2004 | |
| WO | WO 2005/068747 | A1 | 7/2005 | |
| WO | WO 2006/043893 | A1 | 4/2006 | |
| WO | WO 2006/103500 | A1 | 10/2006 | |
| WO | WO 2006/104436 | A1 | 10/2006 | |
| WO | WO 2007/015669 | A2 | 2/2007 | |
| WO | WO 2007/015669 | A3 | 2/2007 | |
| WO | WO 2007/079845 | A1 | 7/2007 | |
| WO | WO 2008/004960 | A2 | 1/2008 | |
| WO | WO 2008/004960 | A3 | 1/2008 | |
| WO | WO 2008/004960 | A8 | 1/2008 | |
| WO | WO 2008/017281 | A1 | 2/2008 | |
| WO | WO 2008/017301 | A2 | 2/2008 | |
| WO | WO 2008/017301 | A3 | 2/2008 | |
| WO | WO 2008/150234 | A1 | 12/2008 | |
| WO | WO 2009/136195 | A1 | 11/2009 | |
| WO | WO 2010/023042 | A1 | 3/2010 | |
| WO | WO 2010/070472 | A2 | 6/2010 | |
| WO | WO 2010/070472 | A3 | 6/2010 | |
| WO | WO 2010/070605 | A2 | 6/2010 | |
| WO | WO 2010/070605 | A3 | 6/2010 | |
| WO | WO 2010/082171 | A2 | 7/2010 | |
| WO | WO 2010/087752 | A1 | 8/2010 | |
| WO | WO 2011/012104 | A2 | 2/2011 | |
| WO | WO 2011/012104 | A3 | 2/2011 | |
| WO | WO 2011/085710 | A1 | 7/2011 | |
| WO | WO 2011/151737 | A2 | 12/2011 | |
| WO | WO 2011/151737 | A3 | 12/2011 | |
| WO | WO 2011/151737 | A9 | 12/2011 | |
| WO | WO 2011/151758 | A2 | 12/2011 | |
| WO | WO 2011/151758 | A3 | 12/2011 | |
| WO | WO 2012/095454 | A1 | 7/2012 | |
| WO | WO 2012/154113 | A1 | 11/2012 | |
| WO | WO 2013/009257 | A1 | 1/2013 | |
| WO | WO 2013/025163 | A1 | 2/2013 | |
| WO | WO 2013/080160 | A1 | 6/2013 | |
| WO | WO 2013/093636 | A2 | 6/2013 | |

(56) References Cited

FOREIGN PATENT DOCUMENTS

| | | |
|---|---|---|
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/187533 A1 | 11/2016 |
| WO | WO 2017/131574 A1 | 8/2017 |
| WO | WO 2017/135874 | 8/2017 |
| WO | WO 2018/004435 A1 | 1/2018 |
| WO | WO 2018/080387 A1 | 5/2018 |

OTHER PUBLICATIONS

U.S. Appl. No. 14/573,572, Christian Boo, filed Dec. 17, 2014, (Cited herein as US Patent Application Publication No. 2015/0198181 A1 of Jul. 16, 2015).

U.S. Appl. No. 15/271,622, Peter Derelöv and Mats Nilsson, filed Sep. 21, 2016, (Cited herein as US Patent Application Publication No. 2017/0079433 A1 of Mar. 23, 2017).

U.S. Appl. No. 15/308,872, Darko Pervan, filed Nov. 4, 2016, (Cited herein as US Patent Application Publication No. 2017/0089379 A1 of Mar. 30, 2017).

U.S. Appl. No. 15/379,791, Niclas Håkansson and Darko Pervan, filed Dec. 15, 2016, (Cited herein as US Patent Application Publication No. 2017/0097033 A1 of Apr. 6, 2017).

U.S. Appl. No. 15/415,356, Peter Derelöv and Christian Boo, filed Jan. 25, 2017, (Cited herein as US Patent Application Publication No. 2017/0208938 A1 of Jul. 27, 2017).

U.S. Appl. No. 15/422,798, Magnus Fridlund, filed Feb. 2, 2017, (Cited herein as US Patent Application Publication No. 2017/0227035 A1 of Aug. 10, 2017).

U.S. Appl. No. 15/428,469, Magnus Fridlund, filed Feb. 9, 2017, (Cited herein as US Patent Application Publication No. 2017/0227032 A1 of Aug. 10, 2017).

U.S. Appl. No. 15/428,504, Christian Boo, filed Feb. 9, 2017, (Cited herein as US Patent Application Publication No. 2017/0227031 A1 of Aug. 10, 2017).

U.S. Appl. No. 15/432,190, Magnus Fridlund, filed Feb. 14, 2017, (Cited herein as US Patent Application Publication No. 2017/0234346 A1 of Aug. 17, 2017).

U.S. Appl. No. 15/642,757, Peter Derelöv, filed Jul. 6, 2017, (Cited herein as US Patent Application Publication No. 2017/0298973 A1 of Oct. 19, 2017).

U.S. Appl. No. 15/646,714, Peter Derelöv, filed Jul. 11, 2017, (Cited herein as US Patent Application Publication No. 2018/0087552 A1 of Mar. 29, 2018).

U.S. Appl. No. 15/562,254, Peter Derelöv, filed Sep. 27, 2017, (Cited herein as US Patent Application Publication No. 2018/0080488 A1 of Mar. 22, 2018).

U.S. Appl. No. 15/567,507, Christian Boo, Peter Derelöv and Agne Pålsson, filed Oct. 18, 2017, (Cited herein as US Patent Application Publication No. 2018/0112695 A1 of Apr. 26, 2018).

U.S. Appl. No. 15/794,491, Peter Derelöv, filed Oct. 26, 2017, (Cited herein as US Patent Application Publication No. 2018/0119717 A1 of May 3, 2018).

U.S. Appl. No. 15/923,701, Peter Derelöv, filed Mar. 16, 2018, (Cited herein as US Patent Application Publication No. 2018/0202160 A1 of Jul. 19, 2018).

U.S. Appl. No. 15/956,949, Peter Derelöv, filed Apr. 19, 2018.

U.S. Appl. No. 16/027,479, Christian Boo and Peter Derelöv, filed Jul. 5, 2018.

U.S. Appl. No. 15/956,949, Derelöv.

U.S. Appl. No. 16/027,479, Boo, et al.

Derelöv, Peter, U.S. Appl. No. 15/956,949 entitled "Panels for an Assembled Product", filed Apr. 19, 2018.

Boo, Christian, et al., U.S. Appl. No. 16/027,479 entitled "Panels Comprising a Mechanical Locking Device and an Assembled Product Comprising the Panels," filed Jul. 5, 2018.

U.S. Appl. No. 17/398,416, Thomas Meijer, filed Aug. 10, 2021.

Meijer, Thomas, U.S. Appl. No. 17/398,416 entitled "Panels with Edge Reinforcement," filed Aug. 10, 2021.

U.S. Appl. No. 16/228,975, Niclas Håkansson and Darko Pervan, filed Dec. 21, 2018, (Cited herein as US Patent Application Publication No. 2019/0113061 A1 of Apr. 18, 2019).

U.S. Appl. No. 16/220,574, Peter Derelöv, filed Dec. 14, 2018.

U.S. Appl. No. 16/220,585, Peter Derelöv, filed Dec. 14, 2018.

U.S. Appl. No. 16/361,609, Peter Derelöv, Johan Svensson and Lars Gunnarsson, filed Mar. 22, 2019.

U.S. Appl. No. 16/386,732, Christian Boo, filed Apr. 17, 2019.

U.S. Appl. No. 16/386,810, Christian Boo, filed Apr. 17, 2019.

U.S. Appl. No. 16/386,824, Christian Boo, filed Apr. 17, 2019.

U.S. Appl. No. 16/386,874, Peter Derelöv, filed Apr. 17, 2019.

U.S. Appl. No. 16/220,574, Derelöv.

U.S. Appl. No. 16/220,585, Derelöv.

U.S. Appl. No. 16/361,609, Derelöv et al.

U.S. Appl. No. 16/386,732, Boo.

U.S. Appl. No. 16/386,810, Boo.

U.S. Appl. No. 16/386,824, Boo.

U.S. Appl. No. 16/386,874, Derelöv.

International Search Report/Written Opinion dated Jul. 4, 2018 in PCT/SE2018/050492, ISA/SE Patent-och registreringsverket, Stockholm, SE, 10 pages.

Derelöv, Peter, U.S. Appl. No. 16/220,574 entitled "Set of Panels," filed Dec. 14, 2018.

Derelöv, Peter, U.S. Appl. No. 16/220,585 entitled "Set of Panels," filed Dec. 14, 2018.

Derelöv, Peter, et al., U.S. Appl. No. 16/361,609 entitled "Panels Comprising a Mechanical Locking Device and an Assembled Product Comprising the Panels," filed Mar. 22, 2019.

Boo, Christian, U.S. Appl. No. 16/386,732 entitled "Set of Panels With a Mechanical Locking Device," filed Apr. 17, 2019.

Boo, Christian, U.S. Appl. No. 16/386,810 entitled "Set of Panels With a Mechanical Locking Device," filed Apr. 17, 2019.

Boo, Christian, U.S. Appl. No. 16/386,824 entitled "Set of Panels With a Mechanical Locking Device," filed Apr. 17, 2019.

Derelöv, Peter, U.S. Appl. No. 16/386,874 entitled "Symmetric Tongue and T-Cross," filed Apr. 17, 2019.

U.S. Appl. No. 16/861,639, Peter Derelöv, filed Apr. 29, 2020.

U.S. Appl. No. 16/946,047, Darko Pervan, filed Jun. 4, 2020.

U.S. Appl. No. 16/915,258, Hans Brännström, Agne Pålsson and Peter Derelöv, filed Jun. 29, 2020.

U.S. Appl. No. 16/861,639, Derelöv.

U.S. Appl. No. 16/946,047, Pervan.

U.S. Appl. No. 16/915,258, Brännström et al.

Derelöv, Peter, U.S. Appl. No. 16/861,639 entitled "Panels Comprising a Mechanical Locking Device and an Assembled Product Comprising the Panels," filed Apr. 29, 2020.

Pervan, Darko, U.S. Appl. No. 16/946,047 entitled "Mechanical Locking System for Building Panels," filed Jun. 4, 2020.

Brännström, Hans, et al., U.S. Appl. No. 16/915,258 entitled "Assembled Product and Method of Assembling the Assembled Product," filed Jun. 29, 2020.

U.S. Appl. No. 16/951,394, Niclas Håkansson and Darko Pervan, filed Nov. 18, 2020.

U.S. Appl. No. 16/953,608, Peter Derelöv, Hans Brännström and Agne Pålsson, filed Nov. 20, 2020.

U.S. Appl. No. 16/951,394, Håkansson et al.

U.S. Appl. No. 16/953,608, Derelöv et al.

Extended European Search Report issued in EP Application No. 18802698.3, dated Nov. 3, 2020, European Patent Office, Munich, DE, 7 pages.

Håkansson, Niclas, et al., U.S. Appl. No. 16/951,394 entitled "Mechanical Locking System for Building Panels," filed Nov. 18, 2020.

(56) References Cited

OTHER PUBLICATIONS

Derelöv, Peter, et al., U.S. Appl. No. 16/953,608 entitled "An Assembled Product and a Method of Assembling the Product," filed Nov. 20, 2020.
U.S. Appl. No. 16/564,438, Hans Brännström, Agne Pålsson and Peter Derelöv, filed Sep. 9, 2019, (Cited herein as US Patent Application Publication No. 2020/0003242 A1 of Jan. 2, 2020).
U.S. Appl. No. 16/553,325, Peter Derelöv and Johan Svensson, filed Aug. 28, 2019.
U.S. Appl. No. 16/553,350, Peter Derelöv and Johan Svensson, filed Aug. 28, 2019.
U.S. Appl. No. 16/567,436, Peter Derelöv and Mats Nilsson, filed Sep. 11, 2019.
U.S. Appl. No. 16/663,603, Magnus Fridlund, filed Oct. 25, 2019.
U.S. Appl. No. 16/697,335, Christian Boo and Peter Derelöv, filed Nov. 27, 2019.
U.S. Appl. No. 16/703,077, Magnus Fridlund, filed Dec. 4, 2019.
U.S. Appl. No. 16/722,096, Peter Derelöv and Christian Boo, filed Dec. 20, 2019.
U.S. Appl. No. 16/553,325, Derelöv et al.
U.S. Appl. No. 16/553,350, Derelöv et al.
U.S. Appl. No. 16/567,436, Derelöv.
U.S. Appl. No. 16/663,603, Fridlund.
U.S. Appl. No. 16/697,335, Boo et al.
U.S. Appl. No. 16/703,077, Fridlund.
U.S. Appl. No. 16/722,096, Derelöv et al.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.
Derelöv, Peter, U.S. Appl. No. 16/567,436 entitled "Panels Comprising a Mechanical Locking Device and an Assembled Product Comprising the Panels," filed Sep. 11, 2019.
Fridlund, Magnus, U.S. Appl. No. 16/663,603 entitled "Element and Method for Providing Dismantling Groove," filed Oct. 25, 2019.
Boo, Christian, et al., U.S. Appl. No. 16/697,335 entitled "Panels Comprising a Mechanical Locking Device and an Assembled Product Comprising the Panels," filed Nov. 27, 2019.
Fridlund, Magnus, U.S. Appl. No. 16/703,077 entitled "Set of Panels for an Assembled Product," filed Dec. 4, 2019.
Derelöv, Peter, et al., U.S. Appl. No. 16/722,096 entitled "Panels Comprising a Mechanical Locking Device and an Assembled Product Comprising the Panels," filed Dec. 20, 2019.
U.S. Appl. No. 17/119,392, Jimmie Bruno and Zoran Simunic, filed Dec. 11, 2020.
U.S. Appl. No. 17/126,518, Peter Derelöv, filed Dec. 18, 2020.
U.S. Appl. No. 17/119,392, Bruno et al.
U.S. Appl. No. 17/126,518, Derelöv et al.
Bruno, Jimmie, et al. U.S. Appl. No. 17/119,392 entitled "Mechanical Locking System for Panels," filed Dec. 11, 2020.
Derelöv, Peter, U.S. Appl. No. 17/126,518 entitled "Set of Panels with a Mechanical Locking Device," filed Dec. 18, 2020.
U.S. Appl. No. 17/546,356, Peter Derelöv and Hans Brännström, filed Dec. 9, 2021.
U.S. Appl. No. 17/556,146, Christian Boo, filed Dec. 20, 2021.
U.S. Appl. No. 17/665,160, Oscar Rydsjö, Marko Sostar and Patrik Carlsson, filed Feb. 4, 2022.
Derelöv, Peter, et al., U.S. Patent Application No. 17/546,356 entitled "Rail for Cabinets," filed Dec. 9, 2021.
Boo, Christian, U.S. Patent Application No. 17/556,146 entitled "Wedge-shaped Tongue Groove," filed Dec. 20, 2021.
Rydsjö, Oscar, U.S. Patent Application No. 17/665,160 entitled "Mounting Bracket," filed Feb. 4, 2022.
U.S. Appl. No. 17/514,055, Marko Sostar, filed Oct. 29, 2021.
U.S. Appl. No. 17/524,293, Hans Brännström, Agne Pålsson and Peter Derelöv, filed Nov. 11, 2021.
Sostar, Marko, U.S. Appl. No. 17/514,055 entitled "Set of Panels, A Method for Assembly of the Same, and a Locking Device for a Furniture Product," filed Oct. 29, 2021.
Brännström, Hans, et al., U.S. Appl. No. 17/524,293 entitled "Assembled Product and a Method of Assembling the Assembled Product," filed Nov. 11, 2021.
Meijer, U.S. Appl. No. 17/847,655 entitled "Panels Comprising a Mechanical Locking Device and an Associated Assembled Article", filed in the U.S. Patent and Trademark Office Jun. 23, 2022.
Håkansson et al., U.S. Appl. No. 17/869,911 entitled "Mechanical Locking System for Building Panels", filed in the U.S. Patent and Trademark Office Jul. 21, 2022.

\* cited by examiner

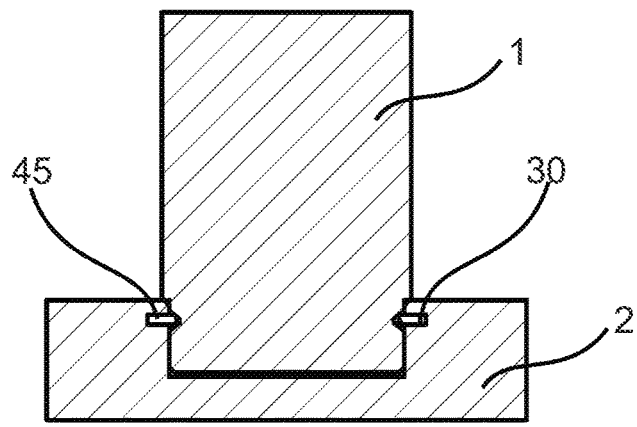
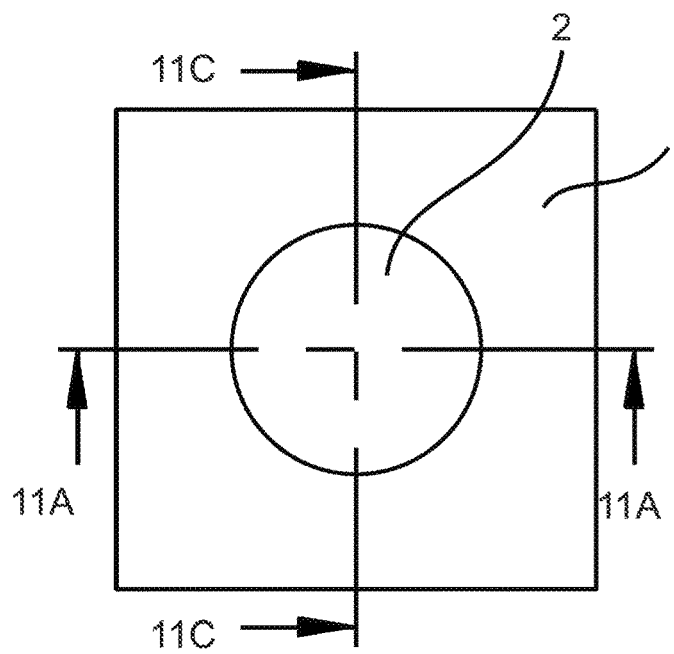
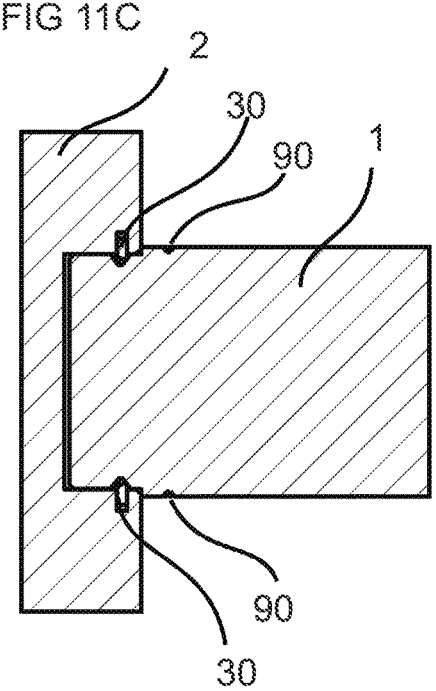
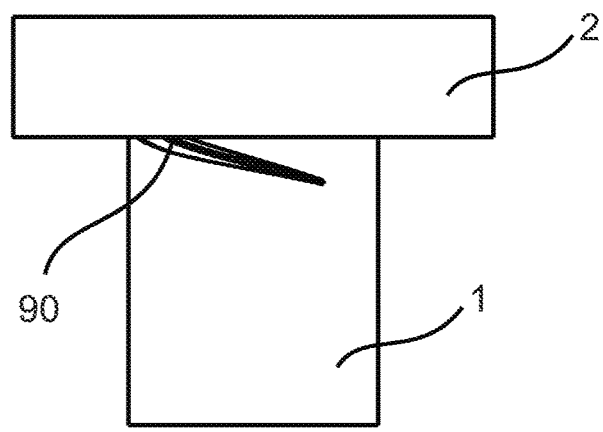

ELEMENTS AND A LOCKING DEVICE FOR AN ASSEMBLED PRODUCT

CROSS REFERENCE TO RELATED APPLICATIONS

The present application claims the benefit of Swedish Application No. 1750593-4, filed on May 15, 2017. The entire contents of Swedish Application No. 1750593-4 are hereby incorporated herein by reference in their entirety.

TECHNICAL FIELD

The present disclosure relates to element for assembled products, such as elements for a furniture component. More particularly, embodiments according to the disclosure relate to a set of elements for an assembled product such as a furniture component which is locked together with a mechanical locking device.

BACKGROUND

A conventional furniture product is provided with a mechanical locking system as shown, for example, in WO2012/154113. The furniture product comprises a first panel connected perpendicularly to a second panel by a mechanical locking system comprising a flexible tongue in an insertion groove.

The present disclosure addresses a widely recognized need to provide a mechanical locking device for cylindrical parts of an assembled product, such as a furniture product, with improved locking.

SUMMARY

It is an object of at least certain embodiments according to the present disclosure to provide an improvement over the above described techniques and known art.

A further object of at least certain embodiments according to the present disclosure is to increase the locking strength of a mechanical locking device for cylindrical parts.

At least some of these and other objects and advantages that may be apparent from the description have been achieved by a first aspect of the disclosure comprising set comprising a first element with a cylindrical shaped part, a second element having a cylindrical shaped groove with a circular opening in an outer surface of the second element, and a mechanical locking device. The mechanical locking device comprises a tongue groove, a displacement groove and a flexible tongue in the displacement groove. The mechanical locking device is configured to lock the cylindrical shaped part to the cylindrical shaped groove. The flexible tongue is configured to cooperate with the tongue groove for locking the cylindrical shaped part to the cylindrical shaped groove. The flexible tongue is configured to be reshaped and displaced in the displacement groove during a locking of the cylindrical shaped part to the cylindrical shaped groove and spring back to a locked position. The flexible tongue is configured to exert a spring force on the tongue groove in the locked position. The flexible tongue comprises a main body, which has an at least partly circular shape in a plane parallel to the circular opening.

The main body with the at least partly circular shape may have the advantage that an increase spring force is achieved. A further advantage may be that a spring force is achieved with several directions, such as perpendicular to each other and/or opposite to each other. This may have the effect that the cylindrical shaped part is firmly locked to the cylindrical shaped groove.

The flexible tongue comprises a first edge which is at least partly circular, said first edge comprising a locking surface which is configured to cooperate with a locking surface of the tongue groove.

The locking surface of the flexible tongue may have an enclosing angle which is more than about 90°, preferably in the range of about 100° to about 300°, preferably about 240°.

The flexible tongue may comprise a second edge which is at least partly circular, said second edge may comprise three or more flexible elements for positioning of the flexible tongue relative the cylindrical shaped part and/or the cylindrical shaped groove. A correct position of the flexible tongue may facilitate the assembling of the first element to the second element.

Each of the flexible elements may protrude towards a bottom of the displacement groove.

The spring force may originate at least partly from a reshape of the flexible elements from a first shape in an unlocked position to a second shape in the locked position.

The flexible tongue may enclose completely or at least partly the cylindrical shaped part. An increased enclosure may have the effect of an increased spring force and an increased locking force.

The flexible tongue may enclose the cylindrical shaped part with an enclosing angle which is more than about 90°, or more than about 180°, or in the range of about 330° to about 360°, or about 345° to about 355°.

The spring force may originate at least partly from a reshape of the main body from a first shape in an unlocked position to a second shape in the locked position.

The reshape of the main body may contribute to about more than 50%, or about 80% to about 95% of the spring force.

The main body comprises a central groove which extends through the main body.

The main body may comprise a split groove which extends from an envelope surface of the main body to the central groove of the main body, wherein the split groove is configured for facilitating assembling of the flexible tongue in the displacement groove.

The flexible tongue may be configured such that a first part of the flexible tongue at a first side of the split groove and second part of the flexible tongue may be pushed away from each other, such that the split groove is enlarged. The enlarged split groove may facilitate an attachment of the flexible tongue in the displacement groove of the cylindrical part.

The flexible tongue may be configured such that a first part of the flexible tongue at a first side of the split groove and second part of the flexible tongue may be pushed towards each other, such that the split groove is decreased, and for some embodiment the first part may overlap the second part. This may facilitate an attachment of the flexible tongue in the displacement groove of the cylindrical groove.

The main body may comprise one or more guiding surfaces at the split groove, wherein the guiding surfaces are configured to cooperate with the cylindrical shaped part for facilitating assembling of the flexible tongue on the cylindrical shaped part.

An envelope surface of the cylindrical shaped groove may comprise the displacement groove or an envelope surface of the cylindrical shaped part may comprise the displacement groove.

An end surface of the first element may be configured to cooperate with the outer surface of the second element in a locked position of the first element and the second element.

An envelope surface of the cylindrical shaped groove and an envelope surface of the cylindrical shaped part may be configured to cooperate in a locked position of the first element and the second element.

The flexible tongue and the tongue groove may be configured to cooperate for a locking of the first element and the second element in a first direction. The envelope surface of the cylindrical shaped groove and the envelope surface of the cylindrical shaped part may be configured to cooperate for a locking of the first element and the second element in a second direction which is perpendicular to the first direction.

The main body may comprise a straight or an essentially straight part which is configured to decrease the bending resistance of the main body. The straight part preferably has an enclosing angle which is in the range of about 5° to about 45°, preferably about 20°. The straight part may have the advantage that the attachment of the flexible tongue in the displacement groove is facilitated and/or that the main body does not break during the attachment.

The main body may comprise one or more grooves which is/are configured to decrease the bending resistance of the main body. The grooves may have the advantage that the attachment of the flexible tongue in the displacement groove is facilitated and/or that the main body does not break during the attachment.

The first element may be configured to be assembled to the second element by a relative displacement of the cylindrical shaped part through the circular opening and into the cylindrical shaped groove to a locked position of the first element and the second element, wherein the flexible tongue is configured to be reshaped and displaced in the displacement groove during said relative displacement.

The flexible tongue may be configured to be attached to the circular part or configured to be attached in the circular groove before the first element is assembled to the second element.

The flexible tongue may be configured to exert a spring force, in the locked position, on the tongue groove at least at two opposite positions of the circular part.

BRIEF DESCRIPTION OF THE DRAWINGS

These and other aspects, features and advantages of which embodiments according to the disclosure are capable of, will be apparent and elucidated from the following description of embodiments, reference being made to the accompanying drawings, in which

FIGS. 11A-11D are a crosscut view, a top view, a crosscut view and a side view, respectively, of an embodiment of the first element, the second element and the flexible tongue, respectively, in a locked position;

DESCRIPTION OF EMBODIMENTS

Figure 1A:
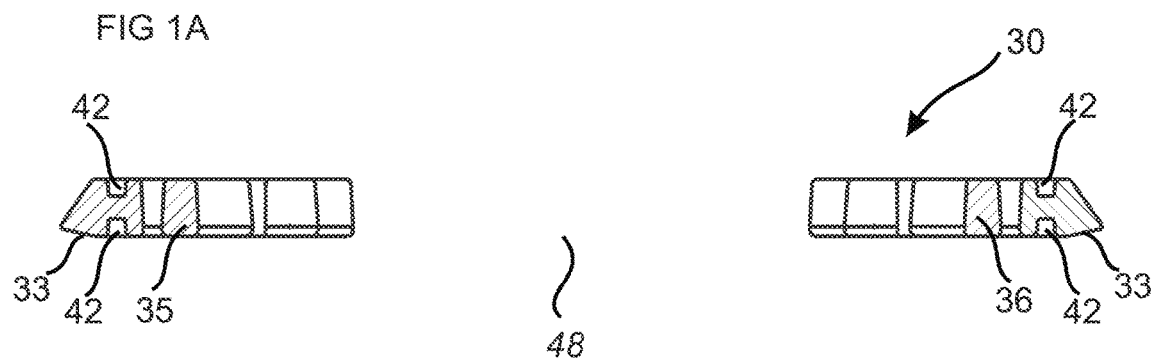
FIG. 1A is a crosscut view of an embodiment of a flexible tongue shown in FIG. 1B.

Specific embodiments according to the disclosure now will be described with reference to the accompanying drawings. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. The terminology used in the detailed description of the embodiments illustrated in the accompanying drawings is not intended to be limiting of the disclosure. In the drawings, like numbers refer to like elements.

Figure 7A:
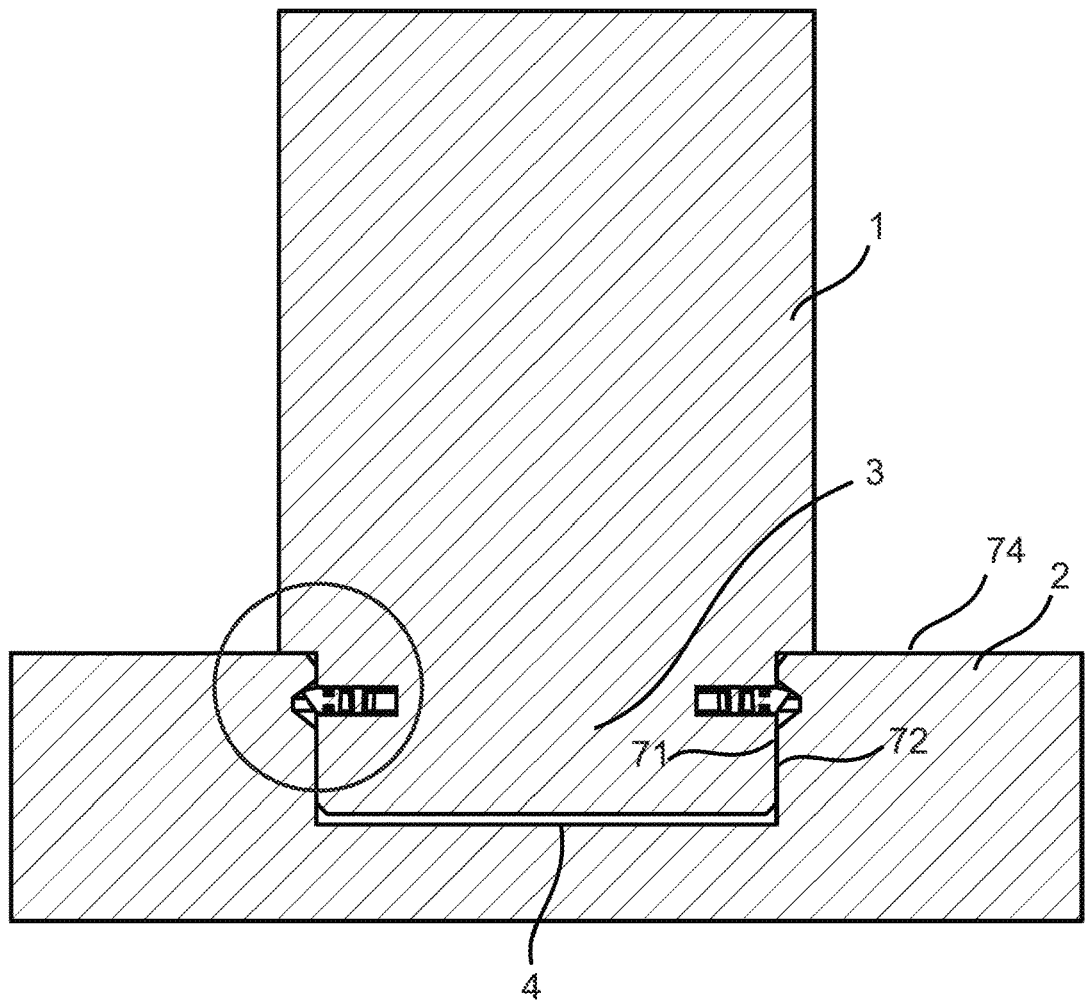
FIG. 7A is a crosscut view of an embodiment of the first element and an embodiment of the second element which are locked together by a locking device comprising an embodiment of the flexible tongue.

The disclosure concerns a set of elements for an assembled product, such as illustrated in FIG. 7A in a crosscut side view. The embodiment of the set comprises a first element 1 with a cylindrical shaped part 3, a second element 2 having a cylindrical shaped groove 4 with a circular opening 75 in an outer surface 74 of the second element, and a mechanical locking device. The mechanical locking device comprises a tongue groove 10, a displacement groove 20 and a flexible tongue 30 in the displacement groove 20. The mechanical locking device is configured to lock the cylindrical shaped part 3 to the cylindrical shaped groove 4. The flexible tongue 30 is configured to cooperate with the tongue groove 10 for locking the cylindrical shaped part 3 to the cylindrical shaped groove 4, wherein the flexible tongue 30 is configured to be reshaped and displaced in the displacement groove 20 during a locking of the cylindrical shaped part 3 to the cylindrical shaped groove 4 and spring back to a locked position. The flexible tongue is configured to exert a spring force on the tongue groove 10 in the locked position. The flexible tongue comprises a main body which has an at least partly circular shape in a plane parallel to the circular opening 75.

An envelope surface 72 of the cylindrical shaped groove 4 and an envelope surface 71 of the cylindrical shaped part 3 are configured to cooperate in a locked position of the first element 1 and the second element 2. The flexible tongue and the tongue groove may be configured to cooperate for a locking of the first element and the second element in a first direction. The envelope surface of the cylindrical shaped groove and the envelope surface of the cylindrical shaped part may be configured to cooperate for a locking of the first element and the second element in a second direction which is perpendicular to the first direction.

The first element in this and other embodiment may comprise one or several of said cylindrical shaped part 3 and the second element 2 may comprise corresponding numbers or more of said cylindrical shaped groove 4.

The first element is configured to be assembled to the second element 2 by a relative displacement of the cylindrical shaped part 3 through the circular opening 75 and into the cylindrical shaped groove 4 to a locked position of the first element 1 and the second element 2, wherein the flexible tongue 30 is configured to be reshaped and displaced in the displacement groove during said relative displacement.

An envelope surface 71 of the cylindrical shaped part 3 comprises in this embodiment the displacement groove 20, and an envelope surface 72 of the cylindrical shaped groove 4 comprises the tongue groove 10.

The flexible tongue 30 of this embodiment is configured to be attached to the circular part 3 before the first element 1 is assembled to the second element 2.

Figure 7B:
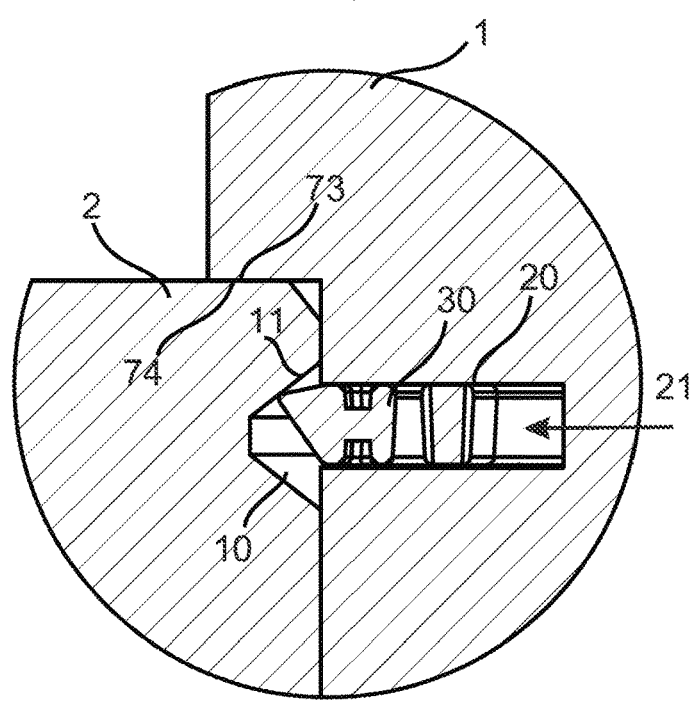
FIG. 7B is an enlargement of the encircled area in FIG. 7A.

The flexible tongue 30 comprises a first edge 46 which is at least partly circular, see e.g. FIGS. 1A-2D and FIGS. 5A-D. Said first edge comprises a locking surface 33 which is configured to cooperate with a locking surface 11 of the tongue groove 10. This is shown in FIG. 7B, which is an enlargement of the encircled are in FIG. 7A. The second edge 47 is in this embodiment closer to a centre of the cylindrical shaped part 3 than the first edge 46.

The locking surface 11 preferably angled in relation to a displacement direction 21 of the displaceable tongue 30 in the displacement groove 20.

An end surface 73 of the first element 1 may be configured to cooperate with the outer surface 74 of the second element 2 in a locked position of the first element 1 and the second element 2.

Figure 8A:
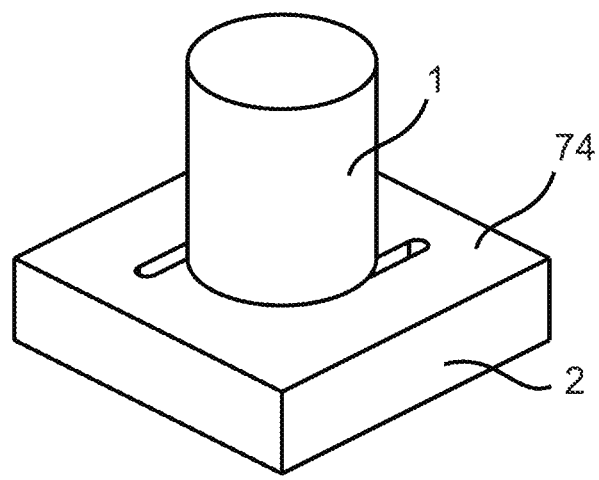
FIG. 8A is a 3D-view of an embodiment of the first element and an embodiment of the second elements in a locked position.
Figure 8B:
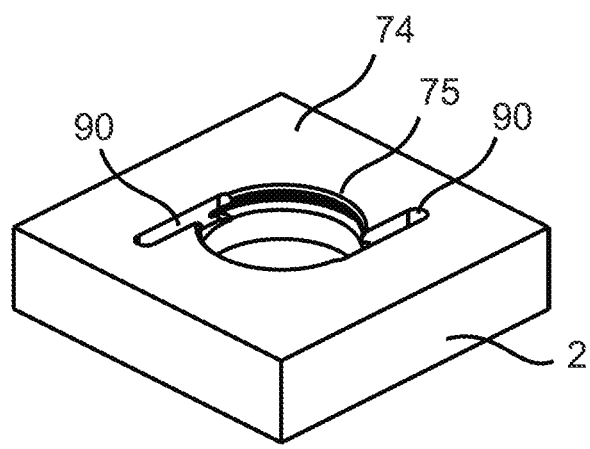
FIG. 8B is a 3D-view of an embodiment of the second element.
Figure 8C:
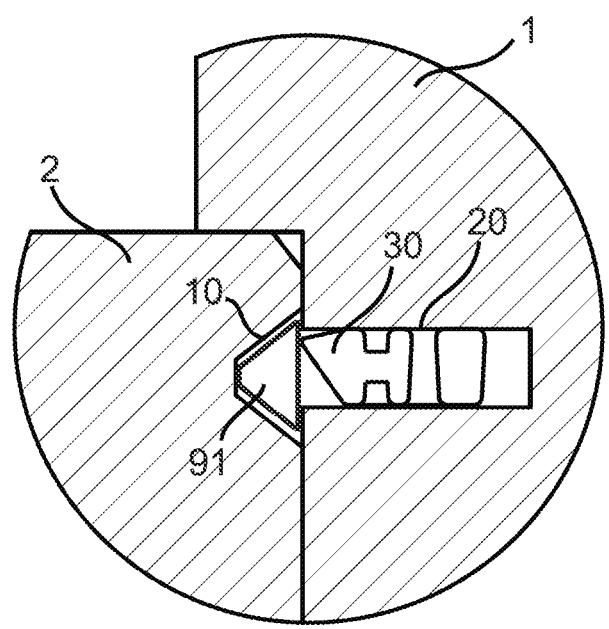
FIG. 8C is a crosscut view of an enlargement of parts of embodiments of the first element the second element, the flexible tongue and a disassemble tool, respectively, during disassembling.

FIG. 8A shows a 3D-view an embodiment of the set shown in FIGS. 7A-7B. FIG. 8B shows an embodiment of the second element 2 of the set shown in FIGS. 7A-7B. The embodiment comprises one or more dismantling grooves 90 in the outer surface 74 of the second element 2. A tool 95 with a longitudinal part 91 is configured to be inserted into the dismantling groove 90 and to unlock the mechanical locking device. The longitudinal part 91 may be bendable such that, when the longitudinal part 91 is inserted into dismantling groove 90 and the tongue groove 10, the shape of longitudinal part 91 adapts to the shape of the dismantling groove 90 and the tongue groove 10. The dismantling groove extends into the tongue groove 10. FIG. 8C shows, in an enlarged crosscut, the mechanical locking device during in an unlocked position. A cross section of the longitudinal part 91 of the tool has unlocked the mechanical locking device by pushing the flexible tongue into the displacement groove 20. The tool 95 may have a handle 92.

The first element may be panel shaped or rod shaped with a rectangular or circular cross-section.

The second element may be panel shaped or rod shaped with a rectangular or circular cross-section.

The first element may be e.g. a leg or rod for a furniture, such as a table, a desk, a chair or a cabinet.

The second element may be a panel for a furniture, such as a table, a desk, a chair or a cabinet.

Figure 1B:
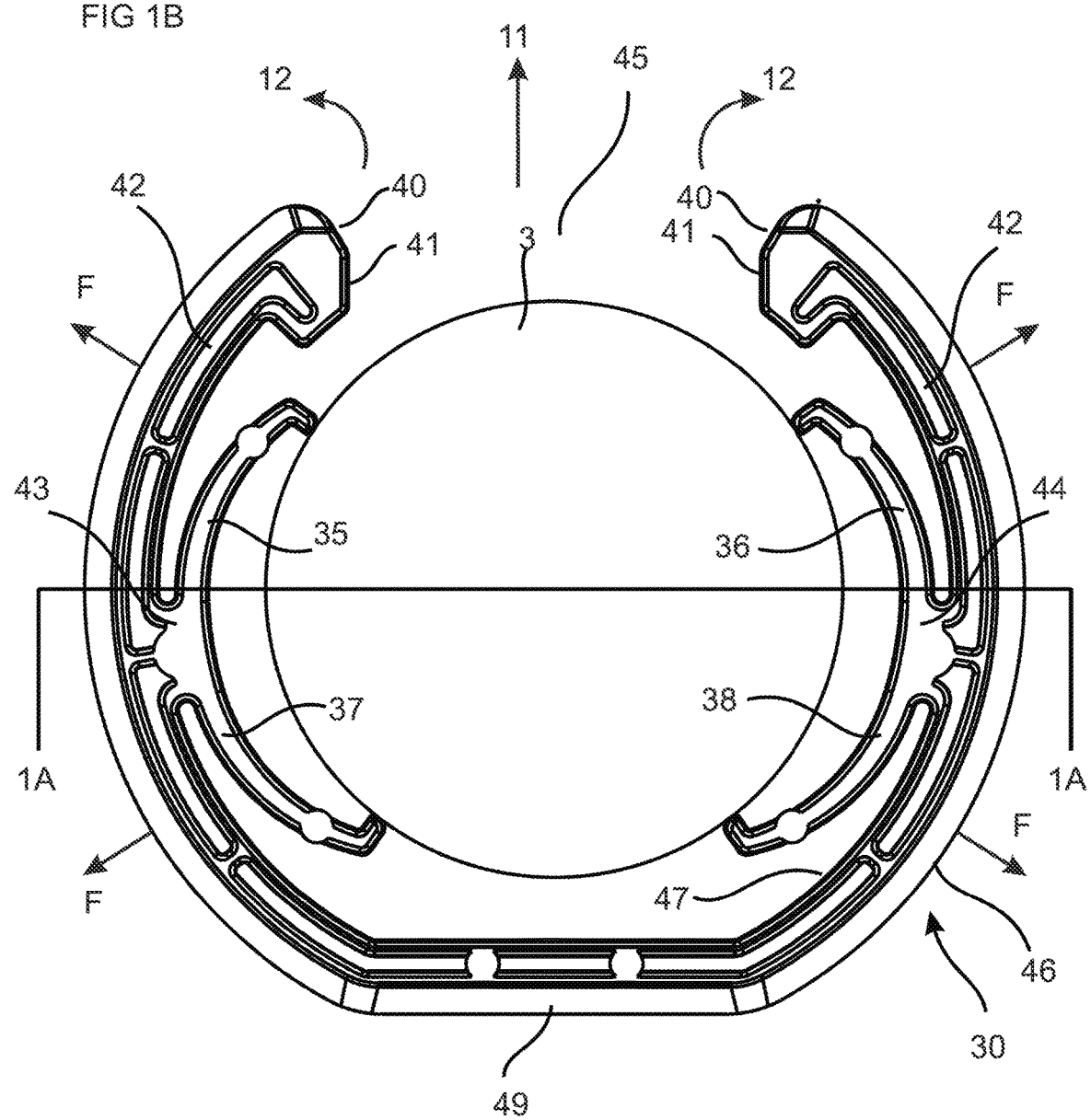
FIG. 1B is a bottom view of an embodiment of flexible tongue attached to a cylindrical part.
Figure 2A:
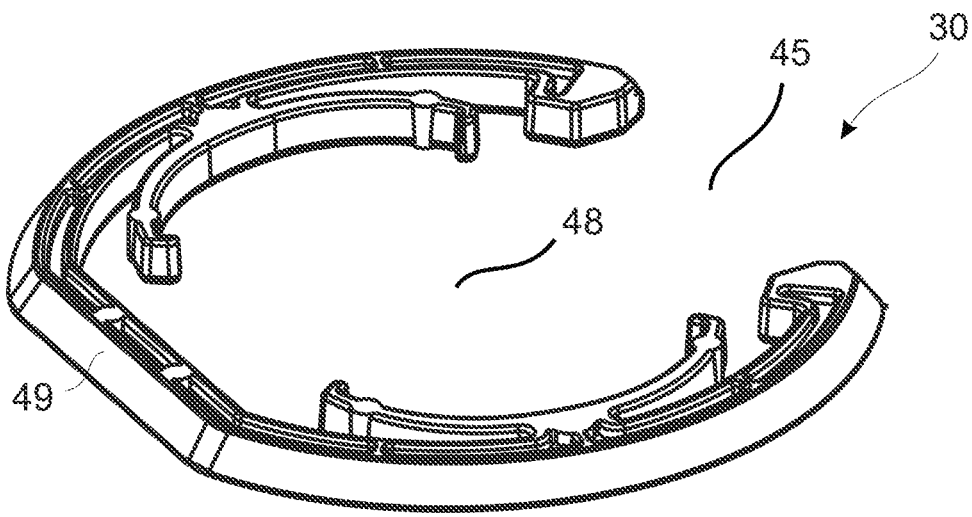
FIG. 2A is a 3D-view of the flexible tongue shown in FIG. 1A-B.
Figure 2B:
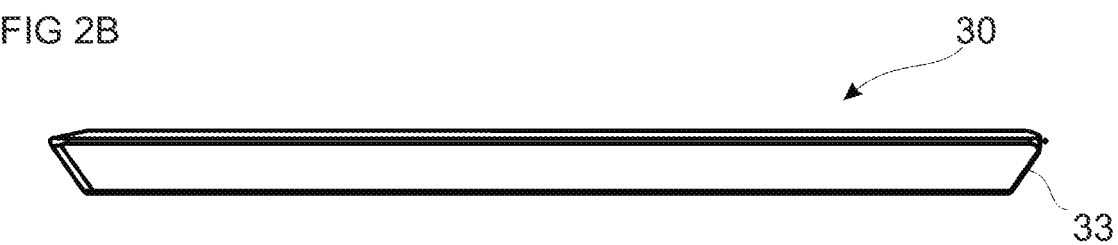
FIG. 2B is a side view of the flexible tongue shown in FIG. 1A-2A.
Figure 2C:
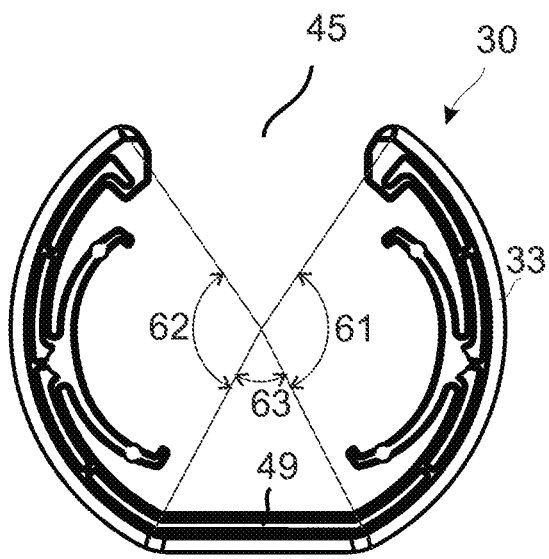
FIGS. 2C-D are bottom views of the flexible tongue shown in FIG. 1A-2B.
Figure 2D:
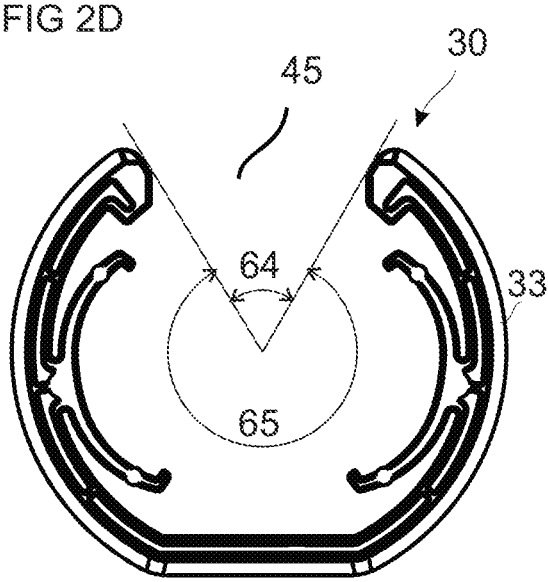
Figure 3A:
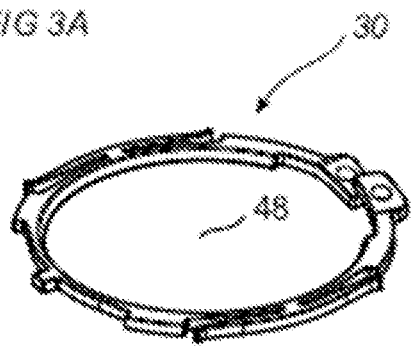
FIGS. 3A-3D show a 3D-view, a crosscut view, a top view and a side view, respectively, of an embodiment of the flexible tongue.
Figure 3B:
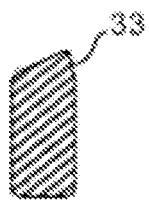
Figure 3C:
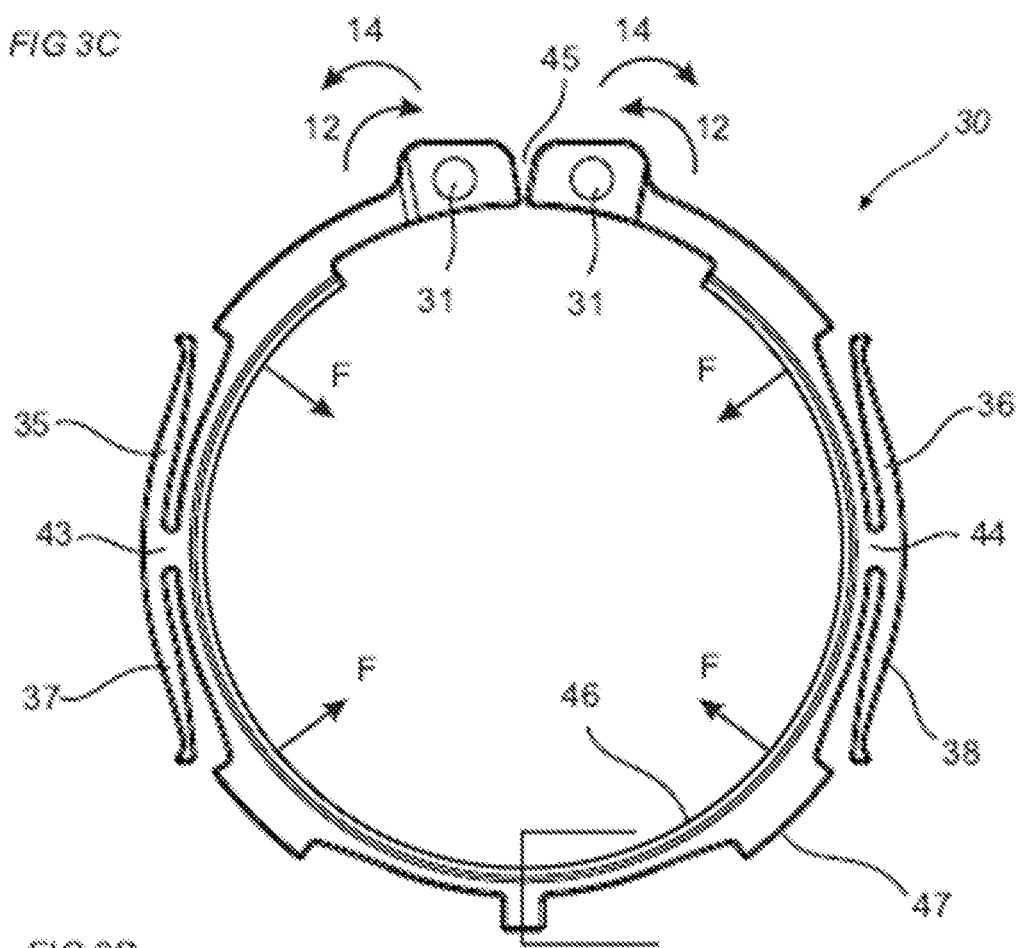
Figure 3D:
Figure 4A:
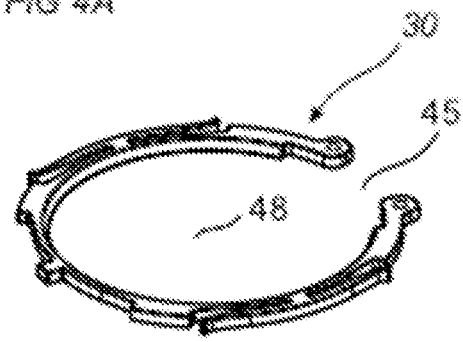
FIGS. 4A-4D show a 3D-view, a crosscut view, a top view and a side view, respectively, of an embodiment of the flexible tongue.
Figure 4B:
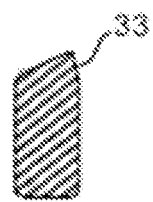
Figure 4C:
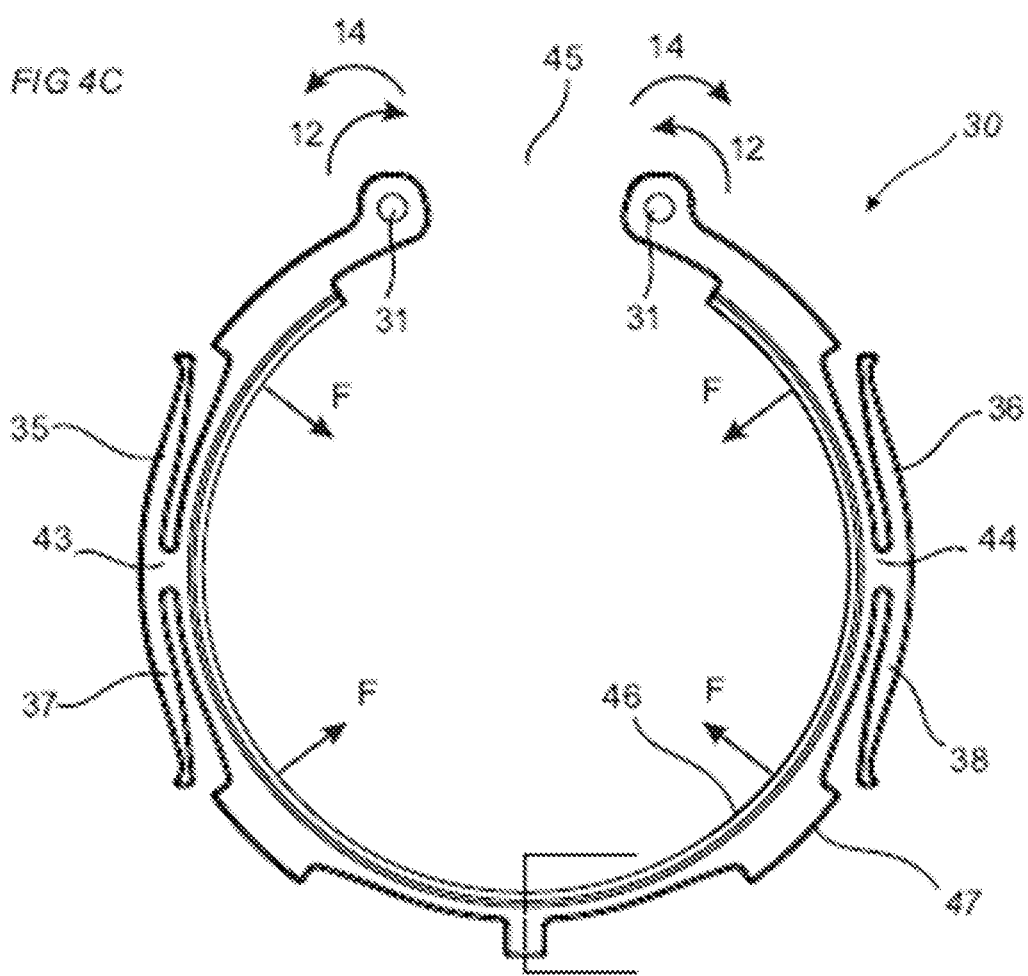
Figure 4D:

An embodiment of the flexible tongue 30 is shown in a bottom view in FIG. 1B and a cross section, along a line indicated by 1A-1A in FIG. 1B, is shown in FIG. 1A. The embodiment is shown in a 3D-view in FIG. 2A, in a side view in FIG. 2B an in a bottom view in FIGS. 2C-2D. The embodiment comprises a first edge 46 which is at least partly circular and comprises a locking surface 33 which is configured to cooperate with the locking surface 11 of the tongue groove 10.

The embodiment of the locking surface 33 of the flexible tongue 30 has a first enclosing angle 61 and a second enclosing angle 62. Each of the first and the second enclosing angle is about 120°, i.e. the total enclosing angle is about 240°. Embodiments of the flexible tongue may have one continuous locking surface or several locking surfaces. An enclosing angle of the locking surface may be more than about 90°, preferably in the range of about 100° to about 300°, preferably about 240°.

The embodiment of the flexible tongue 30 comprises a second edge 47 which is at least partly circular, said second edge comprises three or more flexible elements 35,36,37,38 for positioning of the flexible tongue 30 relative the cylindrical shaped part 3 and/or the cylindrical shaped groove 4.

The flexible elements 35,36,37,38 protrude towards a bottom of the displacement groove 20. The spring force may originate at least partly from a reshape of flexible elements 35,36,37,38 from a first shape in an unlocked position to a second shape in the locked position The main body of the embodiment comprises a first protruding part 43 at a first position and a second protruding part 44 at a second position. A first flexible element 35 and a second flexible element 37 are extending from the first protruding part 43. The first flexible element 35 may extend in a different or essentially opposite direction to the second flexible element 37. A third flexible element 36 and a fourth flexible element 38 are extending from the second protruding part 44. The third flexible element 37 may extend in a different or essentially opposite direction to the fourth flexible element 38. The first protruding part 43 may be poisoned opposite or essentially opposite to the second protruding part 44.

The embodiment of flexible tongue 30 may enclose completely or at least partly the cylindrical shaped part 3. The embodiment may enclose the cylindrical shaped part 3 with an enclosing angle 65 which is more than about 180°, or in the range of about 330° to about 360°, or about 345° to about 355°.

The displacement groove may comprise one or several of said flexible tongue with an enclosing angle 65 which is in the range of about 90° to about 180°.

The spring force may originate at least partly from a reshape of the main body from a first shape in an unlocked position to a second shape in the locked position. The reshape of the main body may contribute to about more than 50% or about 80% to about 95% of the spring force.

The main body of the embodiment of the flexible tongue 30 comprises a central groove 48, which extends through the main body. The main body comprises a split groove 45 which extends from an envelope surface of the main body to the central groove 48 of the main body. The split groove 45 is configured for facilitating assembling of the flexible tongue 30 in the displacement groove 20.

The embodiment of the flexible tongue 30 is during the assembling in the displacement groove displaced 11 relative the cylindrical part 3. During said assembling a first part of the flexible tongue at a first side of the split groove and second part of the flexible tongue may be pushed away from each other, such that the split groove is enlarged. The enlarged split groove may facilitate an attachment of the flexible tongue in the displacement groove of the cylindrical part.

The main body may comprise one or more guiding surfaces 40, 41 at the split groove. The guiding surfaces 40, 41 are configured for facilitating assembling of the flexible tongue on the cylindrical shaped part 3. A first guiding surface 40 may extend in a different direction than a second guiding surface 41, such that the first guiding surface cooperate, during said assembling, with the cylindrical part 3 before the second guiding surface cooperate with the cylindrical part 3.

The main body of the embodiment of the flexible tongue 30 may comprise a straight part 49 which is configured to decrease the bending resistance of the main body. The straight part 48 may have an enclosing angle 63 which is in the range of about 5° to about 45°, preferably about 55°. The straight part may have the advantage that the attachment of the flexible tongue in the displacement groove is facilitated and/or that the main body does not break during the attachment.

The main body of the embodiment of the flexible tongue 30 may comprise one or more grooves 42 which is/are configured to decrease the bending resistance of the main body. The grooves 42 may have the advantage that the attachment of the flexible tongue in the displacement groove is facilitated and/or that the main body does not break during the attachment.

The flexible tongue may be configured to exert a spring force F, in the locked position, on the tongue groove at least at two opposite positions of the circular part.

The flexible tongue may be configured to exert a spring force F with several directions, such as perpendicular to each other and/or opposite to each other. This may have the effect that the cylindrical shaped part is firmly locked to the cylindrical shaped groove.

The embodiment of the flexible tongue 30 is configured to exert a spring force, in the locked position, on the tongue groove at least at two opposite positions of the circular part 3.

Figure 5A:
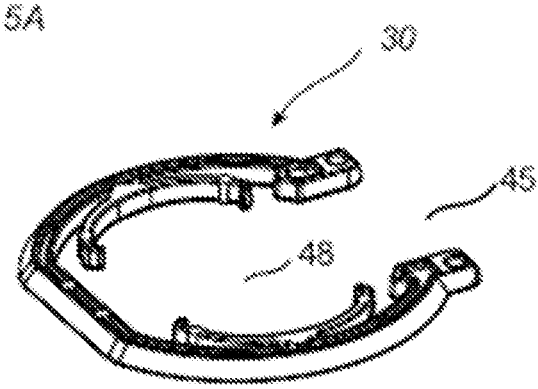
FIGS. 5A-5D show a 3D-view, a crosscut view, a side view and a bottom view, respectively, of an embodiment of the flexible tongue.
Figure 5B:
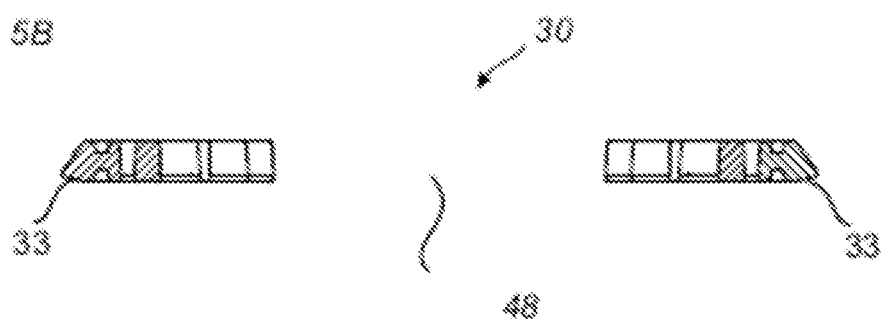
Figures 5C, 5D:
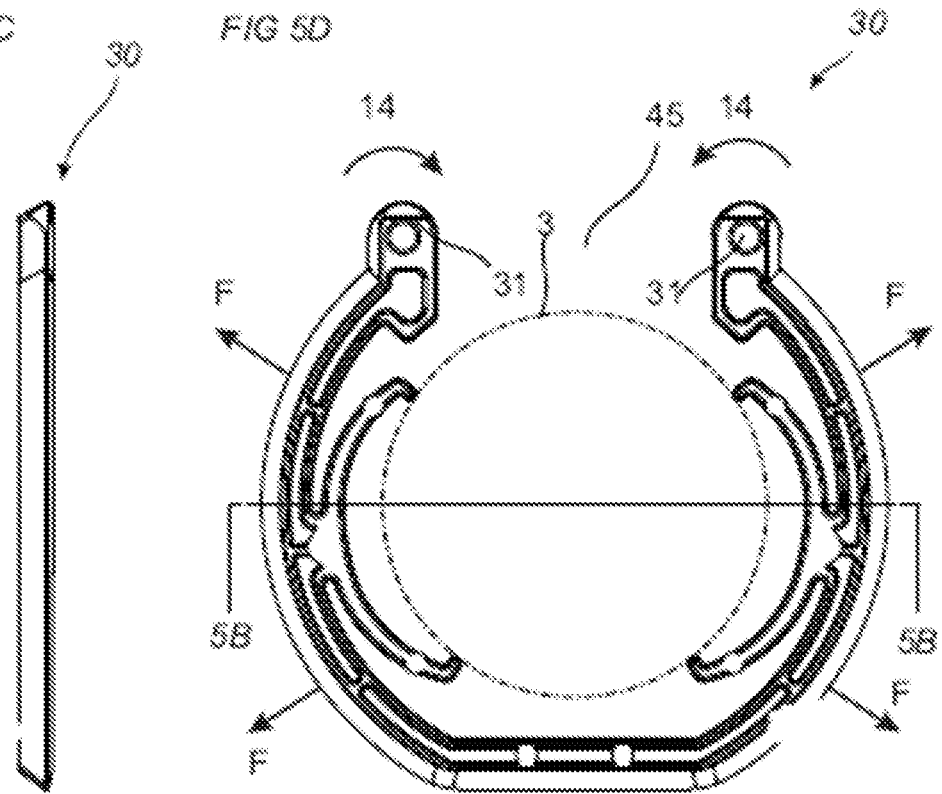
Figure 6A:
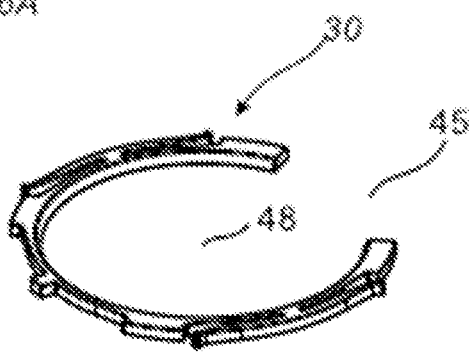
FIGS. 6A-6C show a 3D-view, a crosscut view, a top view and a side view, respectively, of an embodiment of the flexible tongue.
Figure 6B:
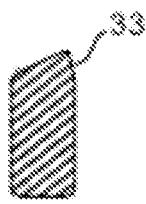
Figure 6C:
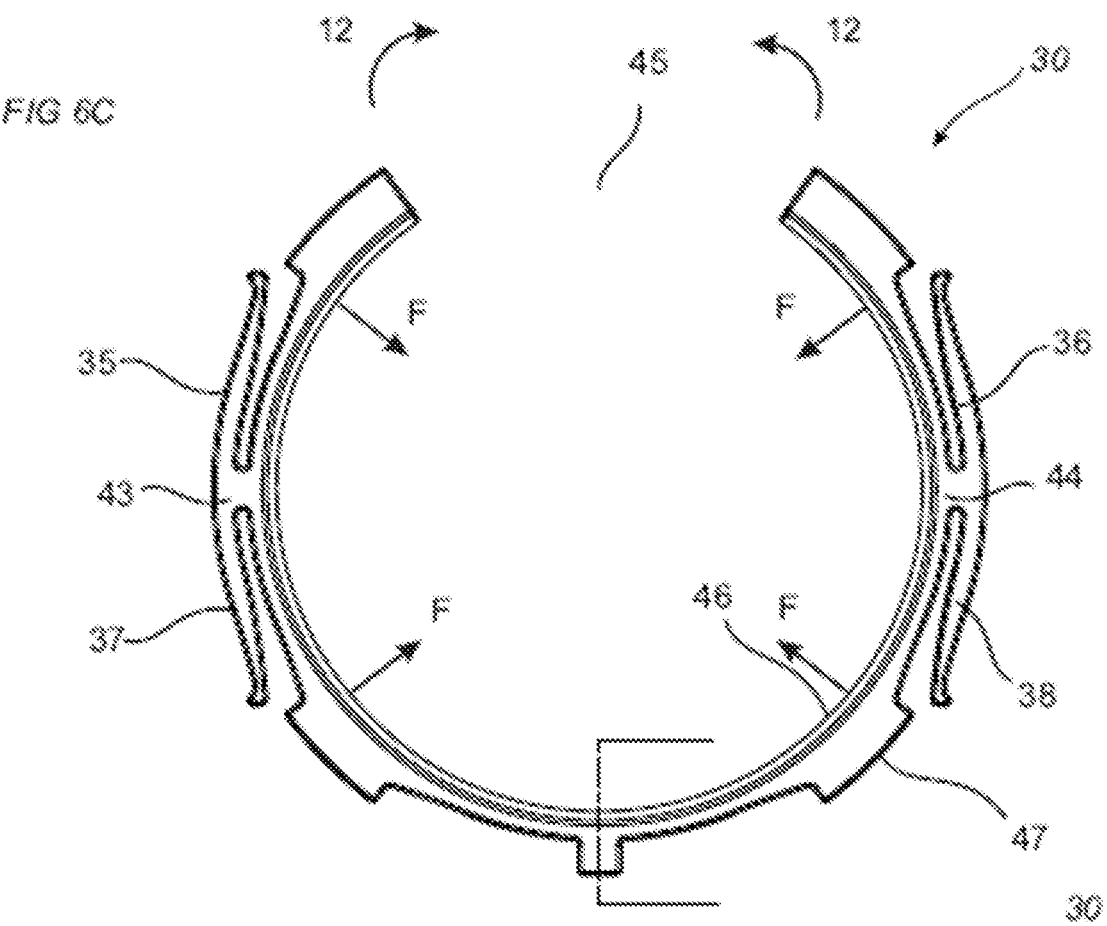
Figure 6D:

An embodiment of the flexible tongue 30 is shown in a 3D view in FIG. 5A, a cross section, along a line indicated by 5A-A in FIG. 5D, in FIG. 5B. The embodiment is shown in side view in FIG. 5C and in a bottom view in FIG. 5D. The embodiment comprises a catch device 31, such as a groove. The catch device is configured to be caught by a second tool, such as pliers. The second tool is configured to displace, as shown by arrows 14 in FIG. 5D, a first part of the flexible tongue towards a second part of the flexible tongue, such that the mechanical locking device is unlocked and the first element may be disassembled from the second element.

Figure 12A:
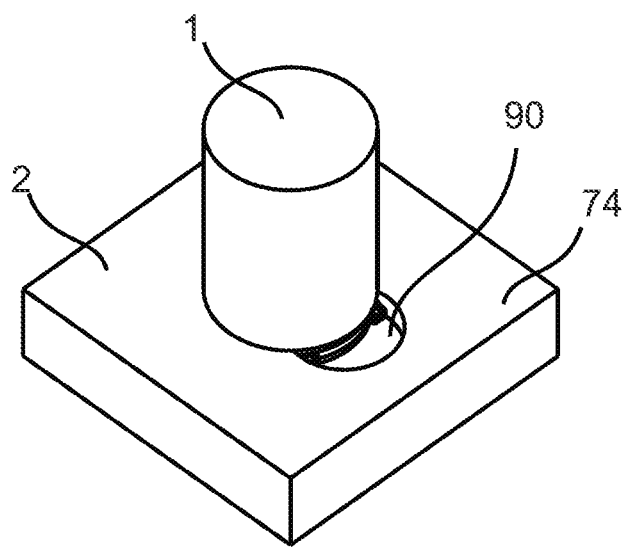
FIG. 12A is a 3D-view of an embodiment of a first element and an embodiment of a second element in a locked position.
Figure 12B:
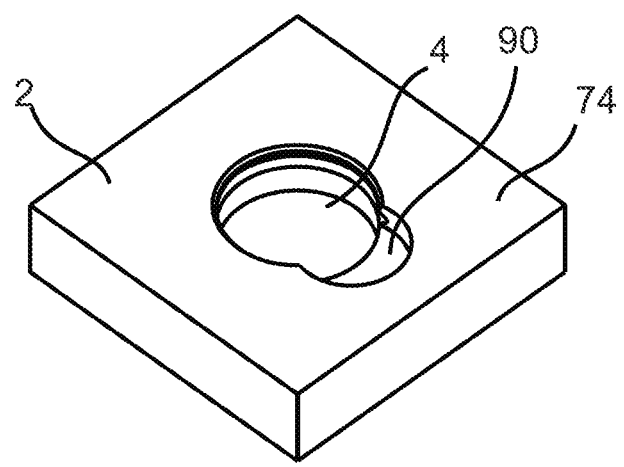
FIG. 12B is a 3D-view of the second element in FIG. 12A.
Figure 13A:
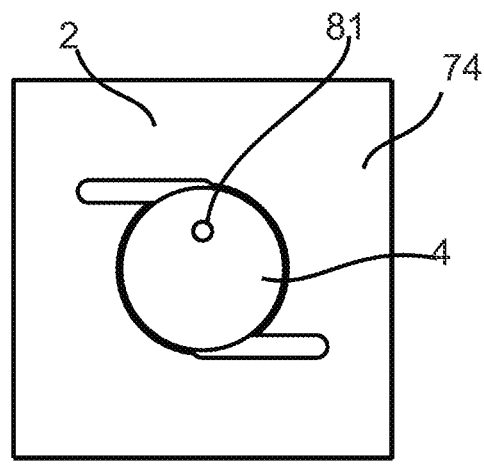
FIG. 13A is a top view of an embodiment of the second element.
Figure 13B:
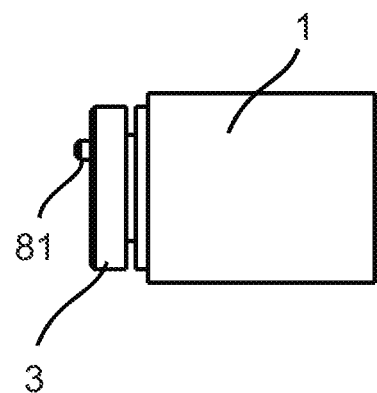
FIG. 13B is a side view of an embodiment of the first element.
Figure 13C:
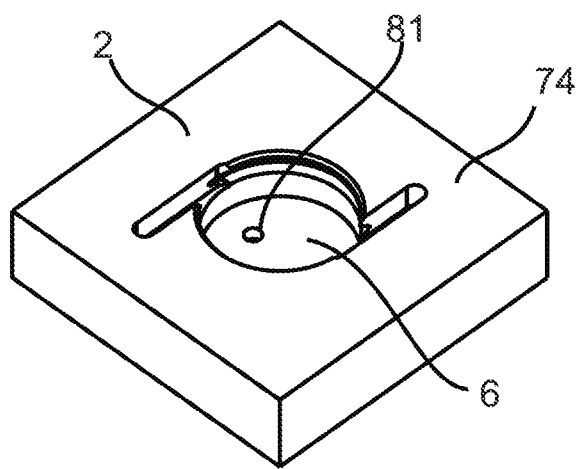
FIG. 13C is a 3D-view of the embodiment of the second element in FIG. 13A.
Figure 13D:
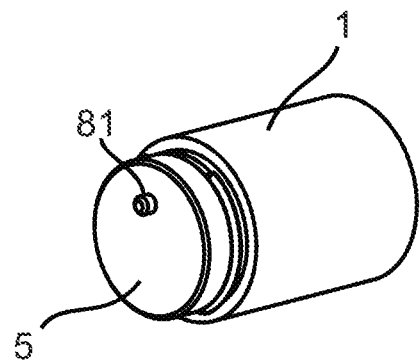
FIG. 13D is a top view of the embodiment of the first element in FIG. 13B.
Figure 14A:
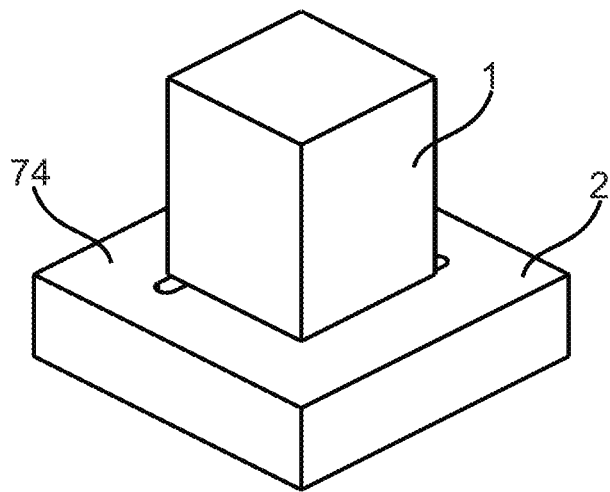
FIG. 14A is a 3D-view of an embodiment of the first element and an embodiment of the second element in a locked position.
Figure 14B:
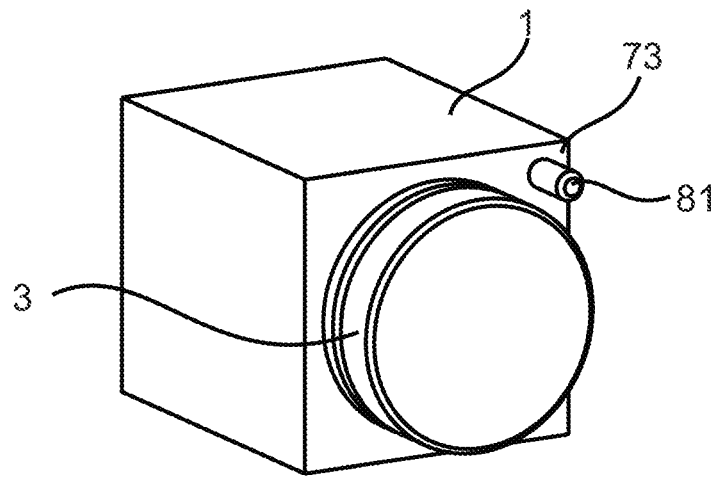
FIG. 14B is a 3D-view the embodiment of the first element in FIG. 14A.
Figure 14C:
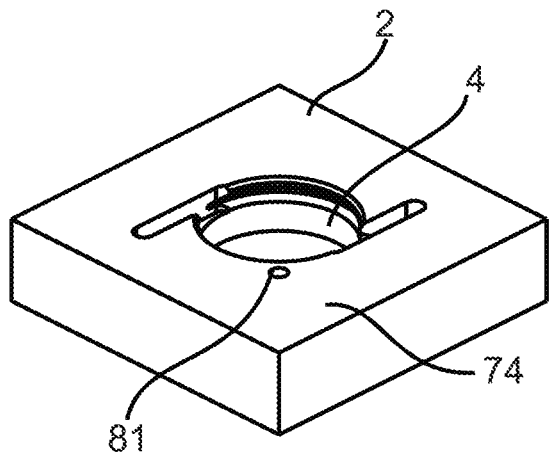
FIG. 14C is a 3D-view the embodiment of the second element in FIG. 14A.
Figure 15A:
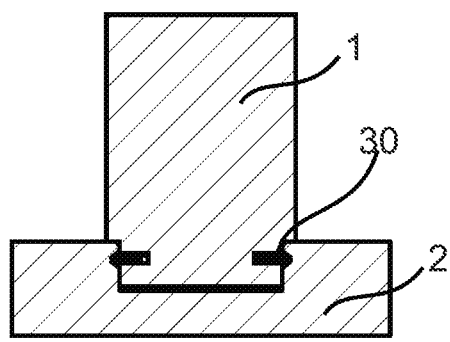
FIG. 15A is a crosscut view of an embodiment of the first element and an embodiment of the second element in a locked position.
Figure 15B:
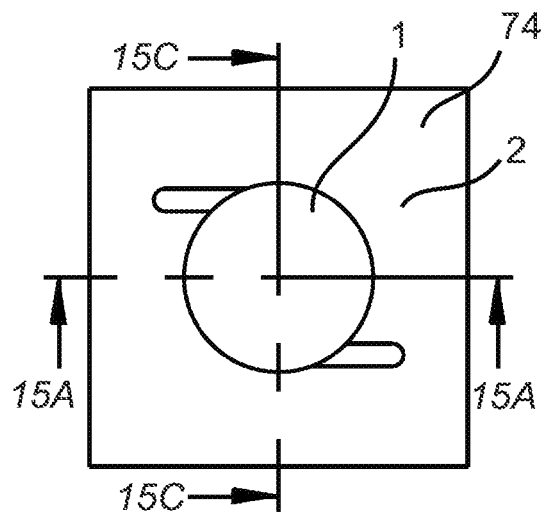
FIG. 15B is a top view of the first element and the second element in FIG. 15A.
Figure 15C:
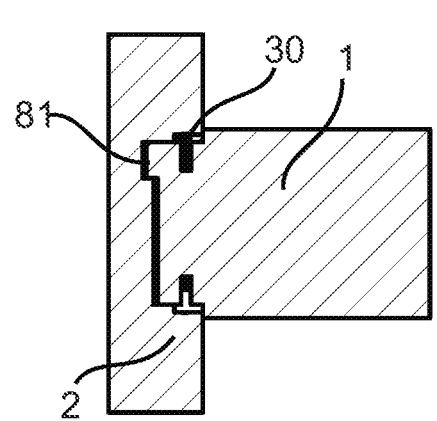
FIG. 15C is a crosscut view of the first element and the second element in FIG. 15B.
Figure 16A:
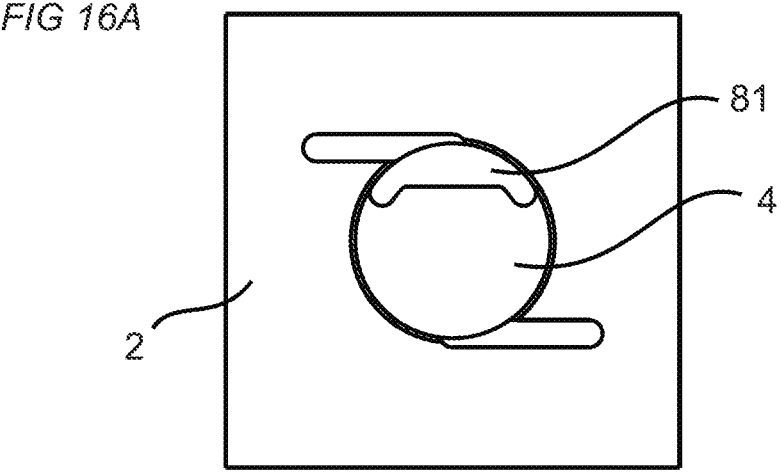
FIG. 16A is a top view of the second element in FIG. 15B.
Figure 16B:
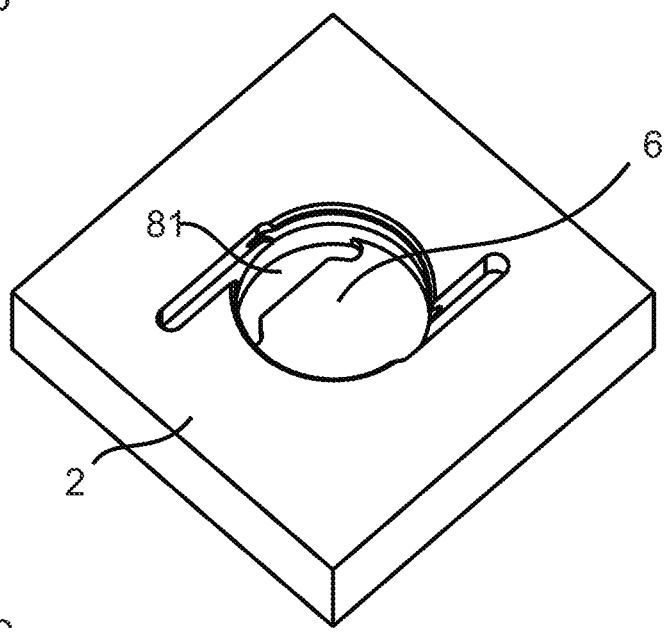
FIG. 16B is a 3D-view of the second element in FIG. 15B.
Figure 16C:
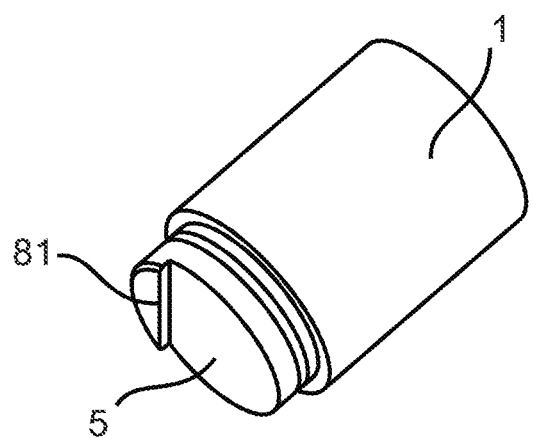
FIG. 16C is a 3D-view of the first element in FIG. 15B.

The flexible tongue may be unlocked by inserting the tool in an embodiment of the dismantling grooves 90 that is shown in FIG. 12A in a 3D-view. The embodiment of the set comprises a first element 1, a second element 2. An outer surface of the second element comprises the dismantling groove 90; FIG. 12B is a 3D-view of the second element in FIG. 12A.

Figure 9A:
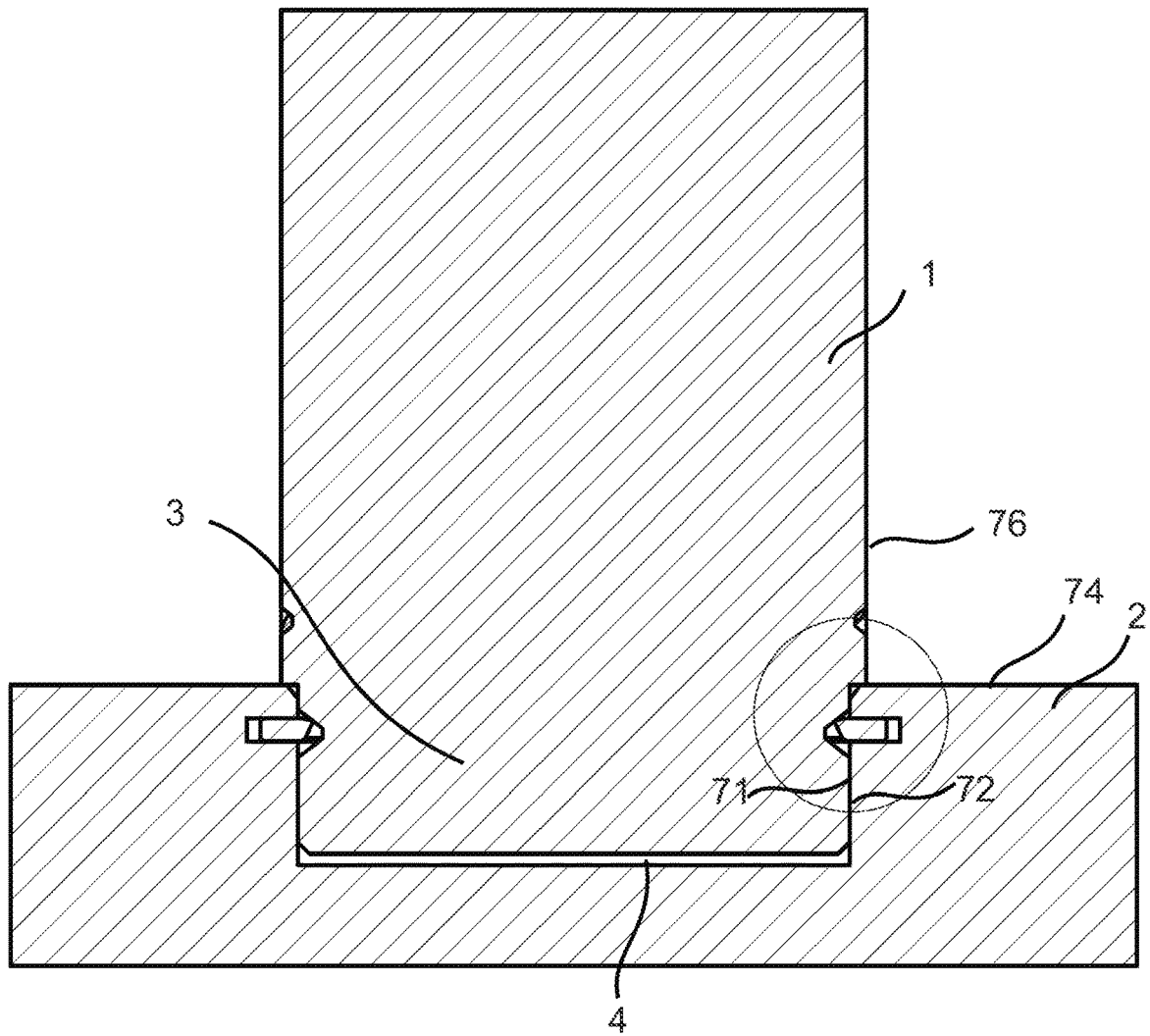
FIG. 9A is a crosscut view of a first element and a second element which are locked together by a locking device comprising an embodiment of the flexible tongue.

An embodiment of the set is shown in FIG. 9A. The embodiment comprises a first element 1 with a cylindrical shaped part 3, a second element 2 having a cylindrical shaped groove 3 with a circular opening 75 in an outer surface 74 of the second element, and a mechanical locking device. The mechanical locking device comprises a tongue groove 10, a displacement groove 20 and a flexible tongue 3 in the displacement groove 20. The mechanical locking device is configured to lock the cylindrical shaped part 3 to the cylindrical shaped groove 4. The flexible tongue 30 is configured to cooperate with the tongue groove 10 for locking the cylindrical shaped part 3 to the cylindrical shaped groove 4, wherein the flexible tongue 30 is configured to be reshaped and displaced in the displacement groove 20 during a locking of the cylindrical shaped part 3 to the cylindrical shaped groove 4 and spring back to a locked position. The flexible tongue is configured to exert a spring force on the tongue groove 10 in the locked position. The flexible tongue comprises a main body which has an at least partly circular shape in a plane parallel to the circular opening 75.

An envelope surface 72 of the cylindrical shaped groove 4 and an envelope surface 71 of the cylindrical shaped part 3 are configured to cooperate in a locked position of the first element 1 and the second element 2. The flexible tongue and the tongue groove may be configured to cooperate for a locking of the first element and the second element in a first direction. The envelope surface of the cylindrical shaped groove and the envelope surface of the cylindrical shaped part may be configured to cooperate for a locking of the first element and the second element in a second direction which is perpendicular to the first direction.

The first element in this and other embodiment may comprise one or several of said cylindrical shaped part 3 and the second element 2 may comprise corresponding numbers or more of said cylindrical shaped groove 4.

The first element is configured to be assembled to the second element 2 by a relative displacement of the cylindrical shaped part 3 through the circular opening 75 and into the cylindrical shaped groove 4 to a locked position of the first element 1 and the second element 2, wherein the flexible tongue 30 is configured to be reshaped and displaced in the displacement groove during said relative displacement.

An envelope surface 72 of the cylindrical shaped groove 4 comprises in this embodiment the displacement groove 20, and an envelope surface 72 of the cylindrical shaped part 3 comprises the tongue groove 10.

The flexible tongue may be configured to exert a spring force F, in the locked position, on the tongue groove at least at two opposite positions of the circular part.

The flexible tongue 30 of this embodiment is configured to be attached to the cylindrical groove 4 before the first element 1 is assembled to the second element 2.

Figure 9B:
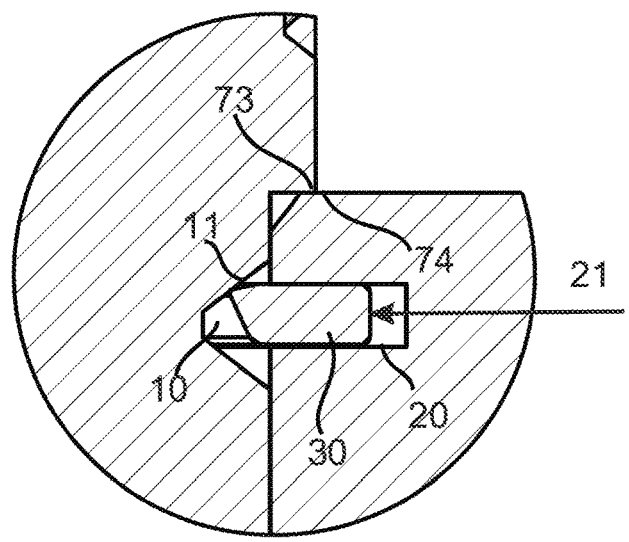
FIG. 9B is an enlargement of the encircled area in FIG. 9A.

The flexible tongue 30 comprises a first edge 46 which is at least partly circular; see e.g. FIGS. 3A-4D and FIGS. 6A-D. Said first edge comprises a locking surface 33 which is configured to cooperate with a locking surface 11 of the tongue groove 10. This is shown in FIG. 9B, which is an enlargement of the encircled are in FIG. 9A. The first edge 46 is in these embodiments closer to a centre of the cylindrical shaped groove 4 than second edge 47.

FIGS. 3A-3D show an embodiment of the flexible tongue 30 configured for the embodiment of the set shown in FIGS. 9A-9B. The embodiment comprises a catch device 31, such as a groove. The catch device is configured to be caught by a second tool, such as pliers. The second tool is configured to displace, as shown by arrows 12 in FIG. 3C, a first part of the flexible tongue towards a second part of the flexible tongue, such that the flexible tongue may be inserted in the displacement groove 20. The first part may be displaced to a position in which it overlaps the second part when the flexible tongue is inserted in the displacement groove. The second tool is configured to displace, as shown by arrows 14 in FIG. 3C, a first part of the flexible tongue away from a second part of the flexible tongue, such that the mechanical locking device is unlocked. The second tool may be inserted into an embodiment of the dismantling groove 90 shown in FIGS. 12A-12B.

FIGS. 4A-4D show an embodiment of the flexible tongue 30 configured for the embodiment of the set shown in FIGS. 9A-9B. The embodiment comprises a catch device 31, such as a groove. The catch device is configured to be caught by a second tool, such as pliers. The second tool is configured to displace, as shown by arrows 12 in FIG. 4C, a first part of the flexible tongue towards a second part of the flexible tongue, such that the flexible tongue may be inserted in the displacement groove 20. The first part may is in this embodiment positioned at a larger distance from the second part. The distance will decrease when the flexible tongue is inserted in the displacement groove. The second tool is configured to displace, as shown by arrows 14 in FIG. 4C, a first part of the flexible tongue away from a second part of the flexible tongue, such that the mechanical locking device is unlocked. The second tool may be inserted into an embodiment of the dismantling groove 90 shown in FIGS. 12A-12B.

The flexible tongue may be configured to exert a spring force F with several directions, such as perpendicular to each other and/or opposite to each other. This may have the effect that the cylindrical shaped part is firmly locked to the cylindrical shaped groove.

FIGS. 6A-6D show an embodiment of the flexible tongue 30 configured for the embodiment of the set shown in FIGS. 9A-9B. This embodiment does not comprise a catch device. An embodiment of the mechanical locking device comprising this embodiment of the flexible tongue may be unlocked with an embodiment of the tool 95 with a longitudinal part 91, as shown in FIG. 8A and described above, which is configured to be inserted into the dismantling groove 90.

The locking surface 11 preferably angled in relation to a displacement direction 21 of the displaceable tongue 30 in the displacement groove 20.

Figure 10A:
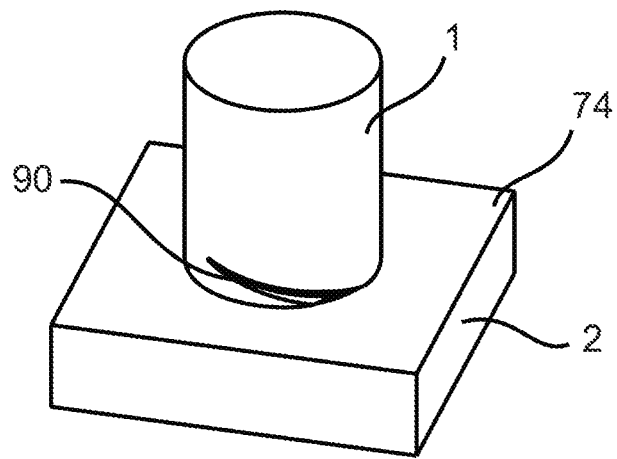
FIG. 10A is a 3D-view of embodiments of the first element and the second elements, respectively in a locked position.
Figure 10B:
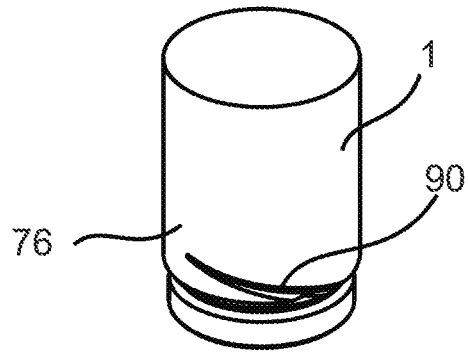
FIG. 10B is a 3D-view of an embodiment of the first element.
Figure 10C:
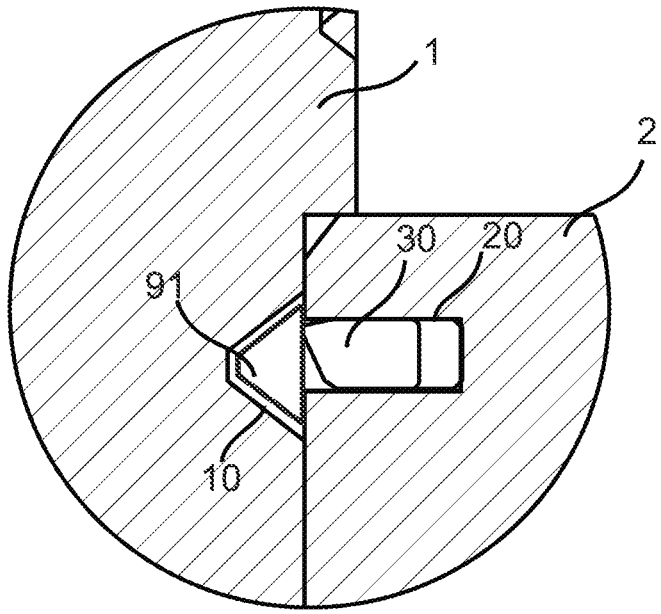
FIG. 10C is a crosscut view of an enlargement of parts of an embodiment of the first element the second element, the flexible tongue and a disassemble tool, respectively, during disassembling

FIG. 10A shows a 3D-view an embodiment of the set shown in FIGS. 9A-9B. FIG. 9B shows an embodiment of the second element 2 of the set shown in FIGS. 9A-9B. The embodiment comprises one or more dismantling grooves 90 in a surface 76 of the element 1. The tool 95 with the longitudinal part 91 is configured to be inserted into the dismantling groove 90 and to unlock the mechanical locking device. The dismantling groove extends into the tongue groove 10. FIG. 10C shows in an enlarged crosscut the mechanical locking device during in an unlocked position. A cross section of the longitudinal part 91 of the tool 95 has unlocked the mechanical locking device by pushing the flexible tongue into the displacement groove 20.

The set shown in FIGS. 9A-9B is shown in a locked position in a first crosscut view in FIG. 11A, the cross section is indicated by the line 11A-11A in the top view of the set shown in FIG. 11B. A second crosscut view is shown in in FIG. 11C, the cross section is indicated by the line 11C-11C in the top view of the set shown in FIG. 11B. A side view of the set is shown in FIG. 11D. FIG. 11C shows a first of said dismantling groove 90 at a first side of the first element 1 and a second of said dismantling groove 90 at a second side of the first element 1.

FIGS. 13A-16C show embodiments of the set comprising a lock 81 for preventing a rotation of the first element 1 relative the second element. The lock 81 may comprise e.g. a groove on the first element 1 and a protruding part on the second element 2 or a protruding part on the first element 1 and a groove on the second element.

An embodiment of the lock 81 is shown in FIGS. 13A-13D comprising a groove on a bottom surface 6 of the cylindrical shaped groove 4 and a protruding part on a bottom surface 5 of the cylindrical shaped part 3. The protruding part is configured to cooperate with the groove for preventing a rotation of the first element 1 relative the second element 2 in a locked position of the first element and the second element. The embodiment is shown in a top view in FIG. 13A, in a side view in FIG. 13B, an in a 3D-view in FIG. 13C-13D.

An embodiment of the lock 81 is shown in FIGS. 14A-14D comprising a groove on the outer surface 74 of the second element 2 and protruding part on a bottom surface 73 of the first element. The protruding part is configured to cooperate with the groove for preventing a rotation of the first element 1 relative the second element 2 in a locked position of the first element and the second element. The embodiment is shown in a 3D view in FIGS. 14A-C.

An embodiment of the lock 81 is shown in FIGS. 15A-16C comprising a longitudinal shaped groove on a bottom surface 6 of the cylindrical shaped groove 4 and a longitudinal shaped protruding part on a bottom surface 5 of the cylindrical shaped part 3. The protruding part is configured to cooperate with the groove for preventing a rotation of the first element 1 relative the second element 2 in a locked position of the first element and the second element. The embodiment is shown in a top view in FIG. 15B with lines 15A-15A and 15C-15C which indicate the cross sections shown in FIGS. 15A and 15C, respectively.

The first element 1 may comprise a wood based material, a polymer material or a metal.

The second element 2 a wood based material or a polymer material.

The locking device may be essentially formed by the mechanical cutting, such as milling, in the material of the first element and the second element.

The flexible tongue may comprise a polymer material, preferably with an enforcement, such as glass fibre. The flexible tongue may be produced by injection moulding.

The second element may comprise a reinforcement plate comprising the circular opening 75. The reinforcement plate may comprise the locking surface 11.

The first element 1 may be an integral part of a furniture, i.e. formed in a furniture element, or a separate part attached to the furniture.

The second element 2 may be an integral part of a furniture, i.e. formed in a furniture element, or a separate part attached to the furniture.

It should also be appreciated that features disclosed in the foregoing description, and/or in the foregoing drawings and/or following claims both separately and in any combination thereof, be material for realizing the present disclosure in diverse forms thereof. When used in the following claims, the terms "comprise", "include", "have" and their conjugates mean, "including but not limited to".

The present above disclosure describes several specific embodiments. However, other embodiments than the above described are equally possible within the scope of the disclosure. Different method steps than those described above may be provided within the scope of the disclosure. The different features and steps may be combined in other combinations than those described. The scope of the invention is only limited by the appended patent claims.

EMBODIMENTS

1. A set comprising:
a first element (1) with a cylindrical shaped part (3);
a second element (2) having a cylindrical shaped groove (4) with a circular opening (75) in an outer surface (74) of the second element; and
a mechanical locking device comprising a tongue groove (10), a displacement groove (20) and a flexible tongue (30) in the displacement groove (20), wherein the mechanical locking device is configured to lock the cylindrical shaped part (3) to the cylindrical shaped groove (4), characterised in
that the flexible tongue (30) is configured to cooperate with the tongue groove (10) for locking the cylindrical shaped part (3) to the cylindrical shaped groove (4),
that the flexible tongue (30) is configured to be reshaped and displaced in the displacement groove (20) during a locking of the cylindrical shaped part (3) to the cylindrical shaped groove (4) and spring back to a locked position,
that the flexible tongue is configured to exert a spring force on the tongue groove (10) in the locked position, and
that the flexible tongue comprises a main body which has an at least partly circular shape in a plane parallel to the circular opening (75).

2. The set as in embodiment 1, wherein the flexible tongue (30) comprises a first edge (46) which is at least partly circular, and wherein said first edge comprises a locking surface (33) which is configured to cooperate with a locking surface (11) of the tongue groove (10).

3. The set as in embodiment 2, wherein the locking surface (33) of the flexible tongue (30) has an enclosing angle (65) which is more than about 90°, preferably in the range of about 100° to about 300°, preferably about 240°.

4. The set as in any one of the embodiments 1-3, wherein the flexible tongue (30) comprises a second edge (47) which is at least partly circular, said second edge comprises three or more flexible elements (35,36,37,38) for positioning of the flexible tongue (30) relative the cylindrical shaped part (3) and/or the cylindrical shaped groove (4).

5. The set as in embodiment 4, wherein each of the flexible elements (35,36,37,38) protrudes towards a bottom of the displacement groove (20).

6. The set as in any one of the embodiments 4-5, wherein the spring force originates at least partly from a reshape of flexible elements (35,36,37,38) from a first shape in an unlocked position to a second shape in the locked position.

7. The set as in any one of the embodiments 1-6, wherein the flexible tongue (30) encloses completely or at least partly the cylindrical shaped part (3).

8. The set as in embodiment 7, wherein the flexible tongue (30) encloses the cylindrical shaped part with an enclosing angle (65) which is more than about 90°, or more than about 180°, or in the range of about 330° to about 360°, or about 345° to about 355°.

9. The set as in any one of the embodiments 1-8, wherein the spring force originates at least partly from a reshape of the main body from a first shape in an unlocked position to a second shape in the locked position.

10. The set as in embodiment 9, wherein the reshape of the main body contributes to about more than 50% or about 80% to about 95% of the spring force.

11. The set as in any one of the embodiments 1-10, wherein the main body comprises a central groove (48), which extends through the main body.

12. The set as in embodiment 11, wherein the main body comprises a split groove (45) which extends from an envelope surface of the main body to the central groove of the main body, wherein the split groove (45) is configured for facilitating assembling of the flexible tongue (30) in the displacement groove (20).

13. The set as in embodiment 12, wherein the main body comprises one or more guiding surfaces (40, 41) at the split groove, wherein the guiding surfaces (40, 41) are configured for facilitating assembling of the flexible tongue on the cylindrical shaped part.

14. The set as in any one of the embodiments 1-13, wherein an envelope surface (72) of the cylindrical shaped groove (4) comprises the displacement groove (20).

15. The set as in any one of the embodiments 1-13, wherein an envelope surface (71) of the cylindrical shaped part (3) comprises the displacement groove (20).

16. The set as in any one of the embodiments 1-15, wherein an end surface (73) of the first element (1) is configured to cooperate with the outer surface (74) of the second element (2) in a locked position of the first element (1) and the second element (2).

17. The set as in any one of the embodiments 1-16, wherein an envelope surface (72) of the cylindrical shaped groove (4) and an envelope surface (71) of the cylindrical shaped part (3) are configured to cooperate in a locked position of the first element (1) and the second element (2).

18. The set as in any one of the embodiments 1-17, wherein the main body comprises a straight part (49) which is configured to decrease the bending resistance of the main body, the straight part (49) preferably having an enclosing angle (63) which is in the range of about 5° to about 45°, preferably about 20°.

19. The set as in any one of the embodiments 1-18, wherein the main body comprises one or more grooves (42) which is/are configured to decrease the bending resistance of the main body.

20. The set as in any one of the embodiments 1-19, wherein the first element (1) is configured to be assembled to the second element (2) by a relative displacement of the cylindrical shaped part (3) through the circular opening (75) and into the cylindrical shaped groove (4) to a locked position of the first element and the second element, wherein the flexible tongue (30) is configured to be reshaped and displaced in the displacement groove during said relative displacement.

21. The set as in embodiment 20, wherein the flexible tongue (30) is configured to be attached to the circular part (3) before the first element (1) is assembled to the second element (2).

22. The set as in embodiment 20, wherein the flexible tongue (30) is configured to be attached in the circular groove (4) before the first element (1) is assembled to the second element (2).

23. The set as in any one of the embodiments 1-21, wherein the flexible tongue (30) is configured to exert a spring force, in the locked position, on the tongue groove at least at two opposite positions of the circular part (3).

The invention claimed is:

1. A set comprising:
a first element with a cylindrical shaped part;
a second element having a cylindrical shaped groove with a circular opening in an outer surface of the second element; and
a mechanical locking device comprising a tongue groove, a displacement groove and a flexible tongue in the displacement groove, wherein the mechanical locking device is configured to lock the cylindrical shaped part to the cylindrical shaped groove, wherein
the flexible tongue is configured to cooperate with the tongue groove for locking the cylindrical shaped part to the cylindrical shaped groove,
the flexible tongue is configured to be reshaped and displaced in the displacement groove during a locking of the cylindrical shaped part to the cylindrical shaped groove and spring back to a locked position,
the flexible tongue is configured to exert a spring force on the tongue groove in the locked position, and
the flexible tongue comprises a main body which has an at least partly circular shape in a plane parallel to the circular opening,
the flexible tongue comprises a second edge which is at least partly circular, said second edge comprises four or more flexible elements for positioning of the flexible tongue relative to the cylindrical shaped part and/or the cylindrical shaped groove, the four or more flexible elements including first, second, third and fourth flexible elements,
the spring force originates at least partly from a reshape of the flexible elements from a first shape in an unlocked position to a second shape in the locked position,
the main body comprises a first protruding part at a first position and a second protruding part at a second position,
the first flexible element and the second flexible element extend from the first protruding part,
the third flexible element and the fourth flexible element extend from the second protruding part,
the main body comprises a central groove which extends through the main body,
a split groove extends from an envelope surface of the main body to the central groove of the main body, the split groove being configured for facilitating assembling of the flexible tongue in the displacement groove, and
the split groove extends between the first and second protruding parts along a circumferential direction of the main body of the flexible tongue.

2. The set as claimed in claim 1, wherein the flexible tongue comprises a first edge which is at least partly circular, and wherein said first edge comprises a locking surface which is configured to cooperate with a locking surface of the tongue groove.

3. The set as claimed in claim 2, wherein the locking surface of the flexible tongue has an enclosing angle which is more than about 90°.

4. The set as claimed in claim 1, wherein each of the flexible elements protrudes towards a bottom of the displacement groove.

5. The set as claimed in claim 1, wherein the flexible tongue encloses completely or at least partly the cylindrical shaped part.

6. The set as claimed in claim 5, wherein the flexible tongue encloses the cylindrical shaped part with an enclosing angle which is more than about 90°.

7. The set as claimed in claim 1, wherein the spring force originates at least partly from a reshape of the main body from a first shape in the unlocked position to a second shape in the locked position.

8. The set as claimed in claim 7, wherein the reshape of the main body contributes to about more than 50% of the spring force.

9. The set as claimed in claim 1, wherein the main body comprises one or more guiding surfaces at the split groove, wherein the guiding surfaces are configured for facilitating assembling of the flexible tongue on the cylindrical shaped part.

10. The set as claimed in claim 1, wherein an envelope surface of the cylindrical shaped groove comprises the displacement groove.

11. The set as claimed in claim 1, wherein an envelope surface of the cylindrical shaped part comprises the displacement groove.

12. The set as claimed in claim 1, wherein an end surface of the first element is configured to cooperate with the outer surface of the second element in a locked position of the first element and the second element.

13. The set as claimed in claim 1, wherein an envelope surface of the cylindrical shaped groove and an envelope surface of the cylindrical shaped part are configured to cooperate in a locked position of the first element and the second element.

14. The set as claimed in claim 1, wherein the main body comprises a straight part which is configured to decrease the bending resistance of the main body, the straight part having an enclosing angle which is in the range of about 5° to about 45°.

15. The set as claimed in claim 1, wherein the main body comprises one or more grooves which is/are configured to decrease the bending resistance of the main body.

16. The set as claimed in claim 1, wherein the first element is configured to be assembled to the second element by a relative displacement of the cylindrical shaped part through the circular opening and into the cylindrical shaped groove to a locked position of the first element and the second element, wherein the flexible tongue is configured to be reshaped and displaced in the displacement groove during said relative displacement.

17. The set as claimed in claim 16, wherein the flexible tongue is configured to be attached to the cylindrical shaped part before the first element is assembled to the second element.

18. The set as claimed in claim 16, wherein the flexible tongue is configured to be attached in the circular groove before the first element is assembled to the second element.

19. The set as claimed in claim 1, wherein the flexible tongue is configured to exert a spring force, in the locked position, on the tongue groove at least at two opposite positions of the cylindrical shaped part.

* * * * *